(12) United States Patent
von Cramon

(10) Patent No.: US 10,306,156 B2
(45) Date of Patent: May 28, 2019

(54) IMAGE-CAPTURE DEVICE

(71) Applicant: Photopotech LLC, Marietta, GA (US)

(72) Inventor: Benjamin von Cramon, Marietta, GA (US)

(73) Assignee: Photopotech LLC, Marietta, GA (US)

( * ) Notice: Subject to any disclaimer, the term of this patent is extended or adjusted under 35 U.S.C. 154(b) by 71 days.

(21) Appl. No.: 15/365,624

(22) Filed: Nov. 30, 2016

(65) Prior Publication Data

US 2017/0155852 A1 Jun. 1, 2017

Related U.S. Application Data

(63) Continuation-in-part of application No. 14/953,615, filed on Nov. 30, 2015.

(51) Int. Cl.
H04N 5/33 (2006.01)
F21V 9/14 (2006.01)
(Continued)

(52) U.S. Cl.
CPC ........... *H04N 5/332* (2013.01); *H04N 5/2252* (2013.01); *H04N 5/2256* (2013.01); *H04N 5/2258* (2013.01)

(58) Field of Classification Search
None
See application file for complete search history.

(56) References Cited

U.S. PATENT DOCUMENTS 6,070,093 A 5/2000 Oosta et al.
6,330,523 B1 * 12/2001 Kacyra ................ G01B 11/002
250/336.1

(Continued)

FOREIGN PATENT DOCUMENTS

WO WO2008127685 A1 10/2008

OTHER PUBLICATIONS

Hershberger, Wil, Taming Those Annoying Highlights: Cross-Polarization Flash Macro Photography, NatureScapes.net—The Resource for Nature Photographers, as found at http://www.naturescapes.net/articles/techniques/taming-those-annoying-highlights-cross-polarization-flash-macro-photography/ on Nov. 3, 2015, pp. 1-3.

(Continued)

*Primary Examiner* — Reza Aghevli
(74) *Attorney, Agent, or Firm* — Robert A. Blaha; Smith Tempel Blaha LLC

(57) ABSTRACT

An image-capture device includes an enclosure, a lens arranged in a lens housing, an illumination source and an image sensor. The illumination source has separately energized light emitters adjacent to the lens housing. When a first light emitter is energized, light oscillating in a first orientation is directed away from the image-capture device. When a second light emitter is energized, light oscillating in a second orientation different from the first orientation is directed away from the image-capture device. Alternatively, an image-capture device includes image sensors, a lens and an illumination source. The illumination source directs emitted light away from the device in different orientations. Light reflected from a subject-of-interest is received in optical paths intersected by respective polarizers. Reflected light passing through a first polarizer is substantially orthogonal to reflected light passing through a second polarizer.

28 Claims, 10 Drawing Sheets

(51) Int. Cl.
*G06T 15/20* (2011.01)
*G06T 17/20* (2006.01)
*H04N 7/18* (2006.01)
*H04N 5/225* (2006.01)

(56) References Cited

U.S. PATENT DOCUMENTS

| | | |
|---|---|---|
| 6,430,371 B1 | 8/2002 | Cho |
| 6,548,796 B1* | 4/2003 | Silvermintz ....... G02B 21/0024 250/201.3 |
| 6,640,130 B1 | 10/2003 | Freeman et al. |
| 6,885,464 B1 | 4/2005 | Pfeiffer et al. |
| 8,498,460 B2 | 7/2013 | Patwardhan |
| 8,731,240 B1 | 5/2014 | Woodman et al. |
| 9,078,619 B2 | 7/2015 | Panasyuk et al. |
| 9,082,946 B2 | 7/2015 | Vdovin et al. |
| 9,091,860 B2 | 7/2015 | Read et al. |
| 9,165,521 B2 | 10/2015 | Yamazaki et al. |
| 9,307,159 B2 | 4/2016 | Kanamori |
| 9,314,150 B2 | 4/2016 | Chen et al. |
| 9,354,185 B2 | 5/2016 | Barakat et al. |
| 9,510,586 B2 | 12/2016 | Hyde et al. |
| 2003/0067760 A1 | 4/2003 | Jagt et al. |
| 2004/0233461 A1* | 11/2004 | Armstrong ........... G01C 11/025 356/620 |
| 2005/0075167 A1 | 4/2005 | Beaulieu et al. |
| 2008/0156406 A1 | 7/2008 | Breed |
| 2008/0216567 A1 | 9/2008 | Breed |
| 2008/0252882 A1 | 10/2008 | Kesterson |
| 2009/0226049 A1 | 9/2009 | Debevec et al. |
| 2010/0268069 A1 | 10/2010 | Liang |
| 2010/0311005 A1 | 12/2010 | Liang |
| 2011/0043806 A1* | 2/2011 | Guetta .................. G01S 17/026 356/432 |
| 2011/0188054 A1 | 8/2011 | Petronius et al. |
| 2011/0206254 A1 | 8/2011 | Patwardhan |
| 2013/0176401 A1* | 7/2013 | Monari ................ H04N 5/2252 348/47 |
| 2013/0242283 A1* | 9/2013 | Bailey ..................... G01S 17/89 356/4.01 |
| 2013/0278631 A1* | 10/2013 | Border ................. G02B 27/017 345/633 |
| 2014/0013361 A1* | 1/2014 | Monari ................ H04N 5/2252 725/62 |
| 2014/0092469 A1* | 4/2014 | Rassier .................. G02B 21/10 359/387 |
| 2014/0177792 A1 | 6/2014 | Barakat et al. |
| 2014/0253686 A1 | 9/2014 | Wong et al. |
| 2014/0291480 A1* | 10/2014 | Bruder ..................... G01C 3/06 250/206 |
| 2015/0112136 A1 | 4/2015 | Gandjbakhche et al. |
| 2015/0164327 A1 | 6/2015 | Yaroslavsky et al. |
| 2015/0181089 A1* | 6/2015 | Mirlay ............... G02B 27/1066 348/46 |
| 2015/0219552 A1 | 8/2015 | Kanamori |
| 2015/0253428 A1* | 9/2015 | Holz ...................... G01S 17/42 356/5.01 |
| 2015/0256733 A1 | 9/2015 | Kanamori |
| 2016/0029612 A1 | 2/2016 | Hyde et al. |
| 2016/0029613 A1 | 2/2016 | Hyde et al. |
| 2016/0065947 A1 | 3/2016 | Cole et al. |
| 2016/0241838 A1 | 8/2016 | Cole et al. |
| 2016/0241892 A1 | 8/2016 | Cole et al. |
| 2016/0275681 A1 | 9/2016 | D'Alessandro |
| 2016/0299057 A1 | 10/2016 | Casas |
| 2016/0343164 A1 | 11/2016 | Urbach et al. |
| 2017/0060131 A1 | 3/2017 | Hyde et al. |
| 2017/0074652 A1* | 3/2017 | Send ...................... G01J 3/513 |

OTHER PUBLICATIONS

Anonymous, Polarization (waves)—Wikipedia, the free encyclopedia, as found at http://en.wikipedia.org/wiki/Polarization_(waves) on Nov. 20, 2015, pp. 1-20.

* cited by examiner

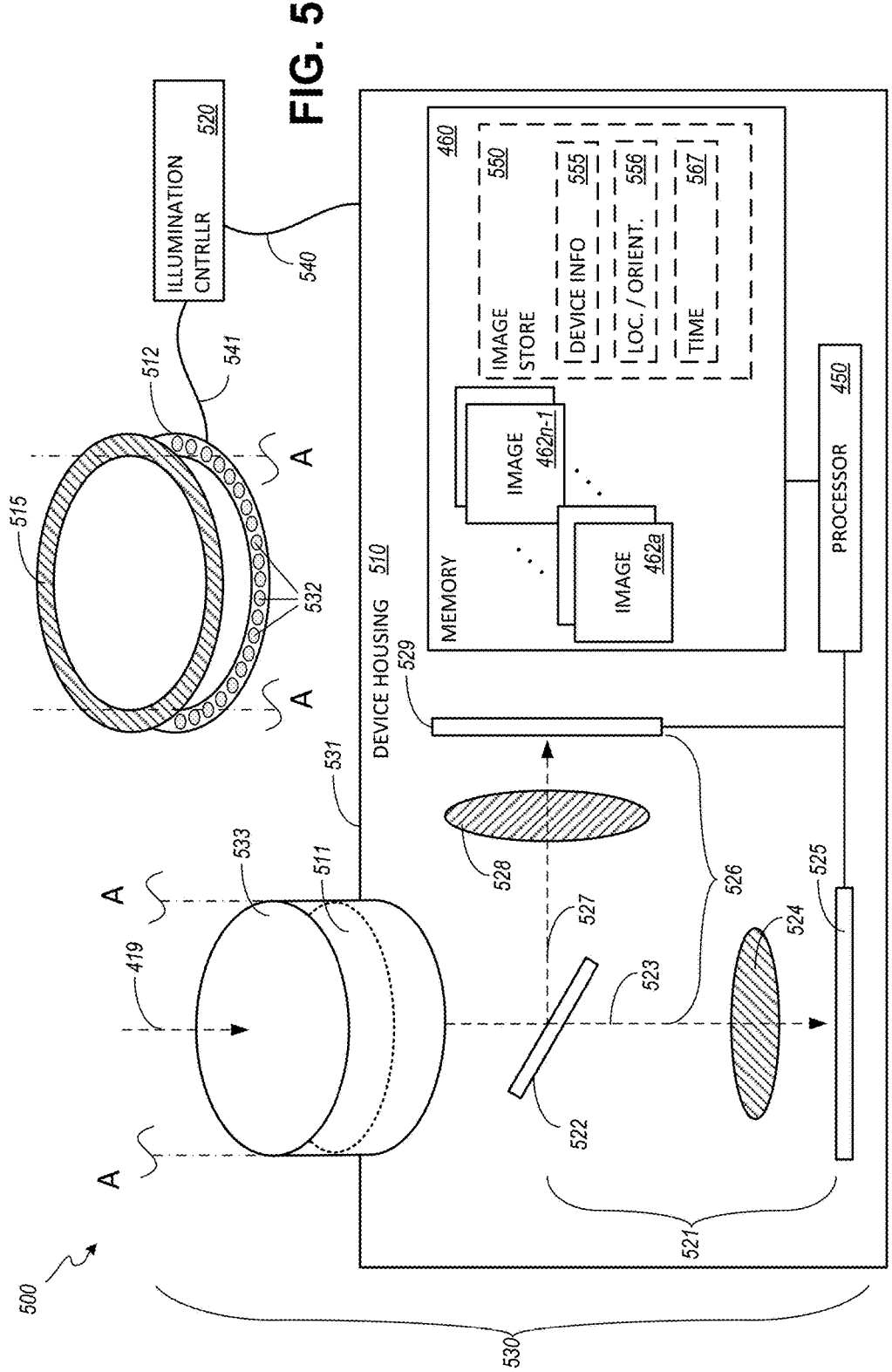

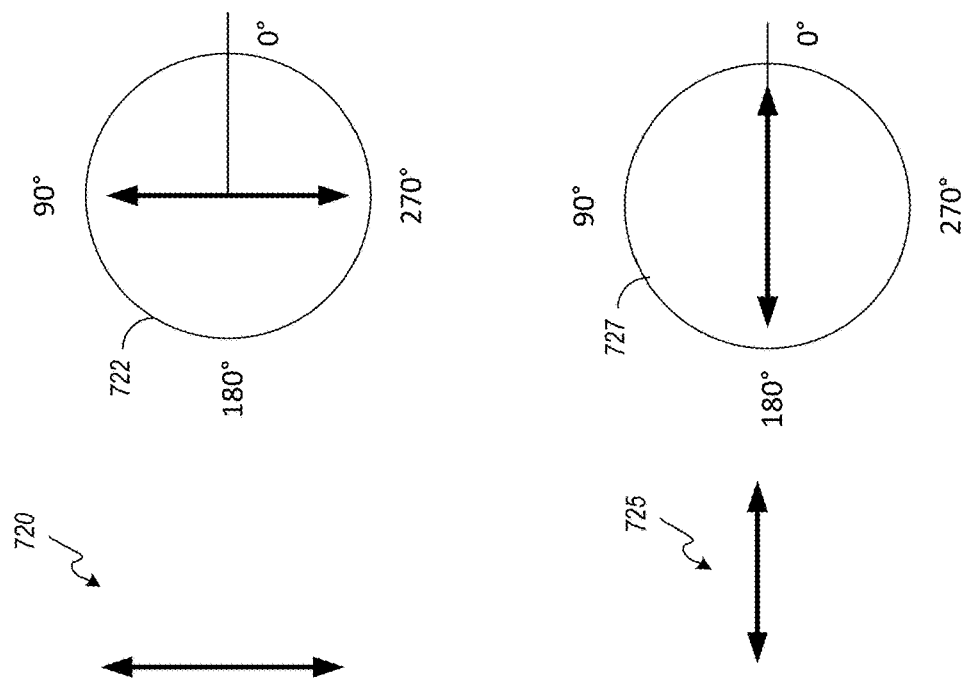
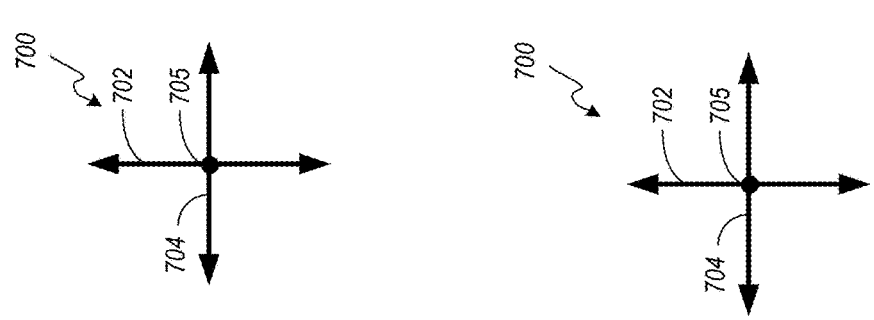
FIG. 7A
FIG. 7B

IMAGE-CAPTURE DEVICE

TECHNICAL FIELD

This invention relates, in general, to photography, photogrammetry and assemblies used for capturing image information of subject matter outside a studio.

BACKGROUND

Photogrammetry-derived virtual environments for use in virtual reality (VR), museum exhibits, video games, and digital cinema are limited to scenes featuring fixed light sources, such as the sun which, in the context of this application, is relatively fixed, and artificial lights. Since photogrammetry relies on sequences of overlapping photos taken from slightly converged angles, the implication is that fixed lighting sources produce shadows, specular reflections and for some materials subsurface reflections that obfuscate the true color and surface features over portions of items in a scene. Fixed light sources can similarly influence data captured using other scanning methodologies.

Studio-based techniques for modeling objects are well-known. To date, such methods introduce an item before an image-capture system bound to a location such as a studio or factory floor where an array of cameras and controlled artificial light sources, such as softboxes, light stages, light projectors, etc., are placed around the object.

For example, techniques for modeling layered facial reflections consisting of specular reflectance, single scattering, shallow and deep sub-surface scattering from the skin of a human face are illustrated and described in U.S. Patent Application Publication Number 2009/0226049 A1 to Debovec et al. (hereinafter referred to as Debovec). Parameters for appropriate reflectance models are derived from 20 photographs recorded in a few seconds from a single viewpoint in a studio environment. Debovec introduces image-capture systems that use a plurality of light sources with controllable output intensities to produce spherical gradient illumination patterns of a person's face. Both the subject-of-interest and the light sources are stationary and generally limited to the confines of a studio. Polarizing filters are arranged adjacent to the light sources to polarize the light from the light sources in a desired orientation. The system includes two or more cameras with a desired polarization adjusted manually. A light projector is added to illuminate a desired portion of person's face. An image processing system receives specular reflectance and diffuse reflectance data from the cameras and calculates reflectance for the facial image based on a layered facial reflectance model. The systems and methods disclosed by Debovec are resource intensive and impractical for capturing images and constructing models of scenes in a non-studio environment.

Images of real-world environments captured during daytime hours present challenges due to the presence of continuous sunlight, the possible presence of ambient light from artificial sources and flash sources when used. Light from each of these sources combines under some operational conditions. Artificial light is affected by its respective inverse square distance from a subject-of-interest, while sunlight is not. The contribution from a flashtube or flashlamp, which release light energy over milliseconds, is mostly unaffected by shutter speed. However, a camera operator subsampling a continuous light source such as the sun or light from an artificial light fixture, when working from a non-stationary platform, can adjust shutter speed until the shutter is fast enough so as not to introduce issues with temporal resolution.

Ambient continuous light from the sun and fixed and unfixed light fixtures separate from a camera, will necessarily introduce fixed shadows in captured images, which are problematic to the development of virtual environments requiring computer graphics (CG) lighting. In the case of a continuous artificial light source, such as a light-emitting diode (LED) based strobe, which continues to release light energy for as long as a power supply can continue to provide sufficient input power, a slower shutter speed enables more light to contact a photosensitive array but with an increased likelihood of loss of temporal resolution for freestanding cameras.

To appear realistic, a virtual environment, even in the presence of simulated fixed light sources and fixed shadows, ideally adapts to changes in the perspective of the observer relative to the scene. Specifically, specular information should change relative to changes between the observer and reflective surfaces of objects in the scene. Specular reflections are typically simulated with a diffuse shader in a layered arrangement under a specular shader. As disclosed by Debovec, additional layers can be included to simulate subsurface scattering of light in partially translucent materials.

Images of real-world environments captured during nighttime hours or in locations blocked from sunlight present challenges when ambient light from artificial sources and flash sources are used to illuminate a scene. Known artificial lighting techniques for minimizing shadows in captured images outside of a studio are problematic for a number of reasons. Generally, there is difficulty in transporting, locating, coordinating and energizing artificial light sources outside a studio environment. Consequently, it is often the case that the combination of natural and artificial light provides insufficient light to accommodate adequate surface-of-interest coverage because of distance, light absorption or both. Under insufficient light conditions, a photographer will increase exposure times and aperture and if possible move closer to the surface-of-interest. However, these longer exposure times necessitate the use of tripods to stabilize the camera position. When thousands of images may be required to map a real-world scene it is impractical to closely position a camera to a surface-of-interest, capture an image, then relocate and adjust a tripod to position the camera for each subsequent exposure necessary to capture a real-world scene.

To avoid the inconvenience and effort of transporting and positioning a tripod for each exposure, one or more artificial light sources, such as strobes, can be synchronized to a shutter mechanism to a minimum of about $\frac{1}{125}^{th}$ of a second for focal plane shutters on most digital single lens reflex (DSLR) cameras. However, photography dependent on artificial lighting capable of anything less than millisecond enabled strobe lighting, e.g., ambient light from the sun and fixed and unfixed light fixtures, will introduce shadows in the captured images.

Specialized lighting is called for when collecting image information for generating virtual environments supporting realistic lighting effects with regard to shifting specular reflections accompanying changes in perspective, shifting shadows accompanying any change in position and possibly rotation of a virtual light source, as well as a host of other changes in the quality of specular reflections and shadows in response to changes in as many parameters governing the physics of the virtual light source, such as virtual reflectors, collimators, and diffusers.

Because the scanning of environments, especially those with many occluded surfaces, requires constant movement of the capture system in order to avoid data shadows, portability of the system is a primary consideration. Lighting hardware with sufficient output to properly expose surfaces in an environment, as opposed to surfaces of a smaller object within an environment, often implies wall current and bulky power supplies, implying a compromise to portability and nuisance factor dealing with power chords. Considering the sheer volume of photographs required for adequate coverage, use of lights on stands is highly impractical if these must be repositioned and adjusted whenever the camera moves to a new position and is redirected, with the result that the lighting needs change accordingly.

The second problem with lights on stands is that they cast shadows. The most effective and efficient workflow supporting realistic virtual lighting of a photorealistic virtual scene, wherein moving a virtual light results in moving its cast shadows, is to avoid introducing shadows into the source photography. A ring strobe directs light that is substantially on-axis with the center axis of the sensor, thus casting shadows behind subject matter, while at the same time providing a highly portable form factor, the illumination source being fixed to the camera.

While an on-axis light source such as a ring light minimizes shadows, an on-axis light source exacerbates specular reflections. Prior art techniques for reducing specular reflection use cross-polarization filters. That is, placing a first polarizer on the light source at 90° with respect to a second polarizer on the lens. However, the loss of through light with thin-film polarizers leads to a combined filter factor of upwards of 3.5 f-stops of available light at the image sensor. The f-number, f-stop number or relative aperture is a dimensionless ratio of the focal length of a lens to the diameter of the aperture. The f-stop number provides a quantitative measure of lens speed. A doubling of the f-stop number halves the size of the aperture. Consequently, each f-stop represents a doubling or halving of the light depending on whether the aperture adjustment is increasing or decreasing the size of the opening. Thus, the use of cross-polarization introduces difficulties in providing sufficient illumination over a practical image area and separation distance between a subject or subjects of interest in a non-studio environment and the camera to achieve an adequate exposure at practical shutter speed, sensitivity and aperture settings.

Light output for purposes of three-dimensional capture is frustrated by numerous factors. To minimize shadows, emitters must be placed as close to the periphery of the lens as possible. Adequate light output can be achieved with concentric rings of emitters, but with every concentric array of emitters, the angle of incidence relative to the center axis of the lens increases, thus casting ever more shadows.

Various camera settings can be leveraged to compensate for inadequate illumination, but each variable runs up against severe constraints imposed by the requirements placed upon photogrammetric data to be useful. For instance, by decreasing shutter speed more light is allowed to strike the sensor for a longer period of time, but because of the need for the capture system to remain highly portable, any movement introduced during an exposure, such as with handheld photography or working off any camera platform that isn't fixed, such as from poles, ropes, or a UAV, may result in useless data. Imagery lacking sharp temporal resolution compromises quality when such images are used for photo projection mapping, and in the case of photogrammetry, such data is entirely useless as a photogrammetry engine searching for common points of interest between overlapping photos has no hope of locking in on imagery plagued by motion blur.

Opening the lens aperture is used to deliver more available light to sensors, but here the softness in pixels, and thus their ruin for 3D capture, is often the result of the shorter depth of field accompanying lower F-stops, quickly throwing nearby and more distance subject matter for given focal plane out of focus. Lastly, digital cameras turn to higher ISO values, driving up the gain of the sensor to boost the signal at a given illumination level. Boosting a signal, of course, also boosts noise, the problem here being that noise is unsightly at best, and in the case of photogrammetry, large grain size confuses an engine searching for common points of interest.

A conventional and portable solution for reducing shadows is described in U.S. Pat. No. 6,430,371 to Cho (hereinafter referred to as Cho), which integrates a ring light guide with a camera. The guide includes a housing attached to the camera by way of an adapter insertion hole having an axis that is coaxial with the lens of the camera. The ring light guide irradiates light toward an object in a direction that is substantially aligned with an axis of the lens of the camera. Cho further describes adjusting the amount of light irradiated to the object dependent upon a camera to object distance. However, the combination disclosed by Cho is limited to objects that are close to the lens. Cho fails to show a combination that addresses light loss from cross polarization that would apply to the capture of subject matter that may be beyond a few feet away from the lens. Cho also describes a manual approach to controlling polarization states, with emphasis on cross-polarization used to cut specular reflections on machine parts and human skin to return diffuse color. No route is described to also record images containing diffuse color and specular reflections, and more importantly in a form such data can be utilized to isolate specular reflections enabling computer graphics lighting in a lighting and rendering engine.

SUMMARY

An example embodiment includes an improved image-based 3D capture device. The image-capture device includes a device enclosure, a lens, an illumination source and an image sensor. The lens is arranged in a lens housing supported by the device enclosure. The illumination source has separately energized light emitters arranged adjacent to the lens housing. When a first light emitter is energized, the image-capture device directs light oscillating in a first orientation away from the image-capture device. When a second light emitter is energized, the image-capture device directs light oscillating in a second orientation different from the first orientation away from the image-capture device. Reflected light passes through the lens and is converted by the image sensor to a data asset.

In another example embodiment the improved image-capture device includes a device enclosure with at least two image sensors, a lens and an illumination source. The lens is supported by the device enclosure. The illumination source directs light away from the enclosure such that the lens receives reflected light from a subject-of-interest and directs the reflected light in a first optical path having a first polarizer and in a second optical path having a second polarizer. The polarizers are arranged such that reflected light that passes through the first polarizer is substantially orthogonal to reflected light that passes through the second polarizer.

In still another example embodiment, an image-capture device comprises an enclosure, light emitters, and first and second sets of image sensors. The light emitters and the first and second sets of image sensors are arranged along a surface of the enclosure. The light emitters direct light oscillating in a first orientation in a direction substantially orthogonal to the surface of the enclosure. The first set of image sensors receive reflected light oscillating in the first orientation. The second set of image sensors receive reflected light oscillating in a second orientation substantially orthogonal to the first orientation.

BRIEF DESCRIPTION OF THE DRAWINGS

The systems and methods for capturing image information can be better understood with reference to the following drawings. The components in the drawings are not necessarily to scale, emphasis instead being placed upon clearly illustrating the involved principles.

FIG. 5 is a schematic diagram of an alternative embodiment of the image-capture device of FIG. 3.

FIG. 7A and FIG. 7B include schematic diagrams illustrating polarization of light.

DETAILED DESCRIPTION OF THE ILLUSTRATED EMBODIMENTS

Figure 1:
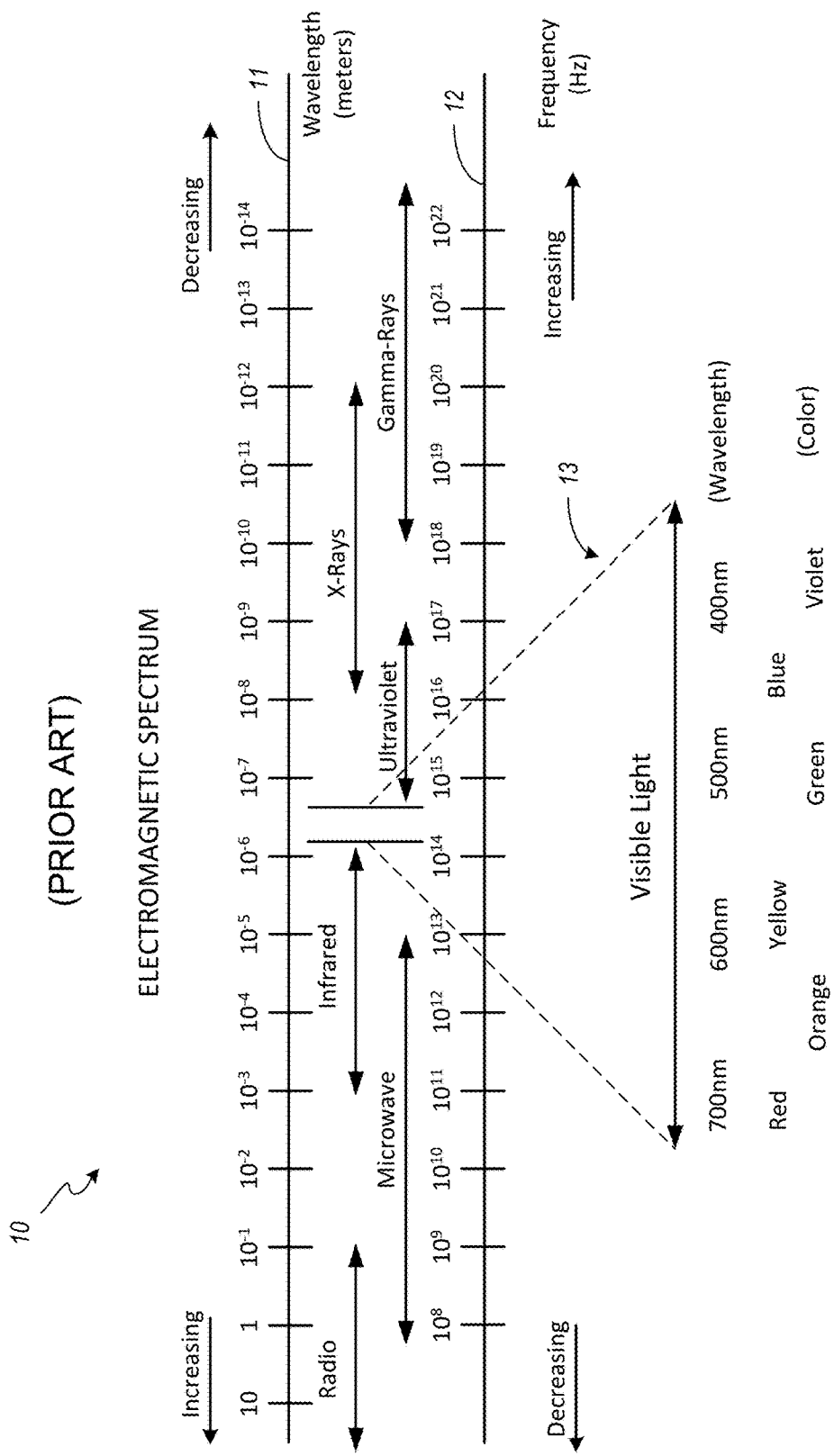
FIG. 1 is a schematic diagram illustrating the electromagnetic spectrum.

In generating photorealistic models of complex real world environments the image capture system is charged with providing a post-processing workflow digital assets containing data that is both useful to a photogrammetry engine employed to solve for geometry in scene reconstruction and provide usable texture data allowing a lighting and rendering engine to realistically simulate the diffuse color and specular reflectance of surface materials. Both objectives, geometry and texture, are best served by controlling polarization states of the lighting in the source photography.

The image capture device is configured to produce lighting for separately recorded exposures that is co-polarized and cross-polarized per image pair. The cross-polarized exposure contains only diffuse color information that is substantially shadow-free, and the co-polarized exposure contains diffuse color with specular reflections that is also substantially shadow free.

As indicated, macro and close-up photographic techniques cannot be applied to adequately illuminate and capture subject matter suitable to accurately model the same in human-scale environments. An exposure captured as a result of such techniques fails to evenly illuminate a subject over the entire image plane. Evenly illuminated exposures are critical to source photography used in 3D scene reconstruction from multiple images and also using alternative scanning methodologies such as laser and structured light in which evenly illuminated photos provide textures by way of projective texture mapping. As further indicated, known portable light sources introduce undesired shadows that obfuscate diffuse color and surface texture of items in a real-world scene that is assembled from photographs. In addition, conventional image processing techniques do not provide sufficient information in a model that can be used to generate realistic specular reflectance under changing lighting conditions in a virtual environment. Moreover, conventional portable photogrammetry includes no solution for capturing subsurface scatter in a model that can be used to support CG lighting in a virtual environment representing a real-world location. In light of the above shortcomings improvements are desired.

Images that include subject matter that was captured with a cross-polarized lighting condition or a cross-polarized exposure provide a first two-dimensional data set or diffuse map that includes substantially shadow-free diffuse color. The image information stored as a result of the cross-polarized exposure is substantially shadow free when the reflected light from a controlled light source is nearly on-axis with the sensor that captures the cross-polarized image. In addition, the cross-polarized exposure or the image that results from such an exposure is substantially free of specular reflections. Such an image includes no discernible bright or shiny spots generally white in color that result from a mirror like reflection of a broad range of the visible spectrum that encounters a surface or surfaces captured in the image.

Images that include subject matter captured with a co-polarized lighting condition or co-polarized exposure provide a separate two-dimensional data set or specular map with substantially shadow-free specular color. The image information stored as a result of the co-polarized exposure is substantially shadow free when reflected light from a controlled light source is nearly on-axis with the sensor that captures the co-polarized image. Images, however captured, may be temporarily stored in a memory in the improved image-capture device.

Alternatively, the images or image information may be communicated to an integrated storage medium and/or to a remote storage medium as desired.

The phrase "ambient light" as used herein means electromagnetic radiation from both natural and artificial sources that are not controlled by a camera or controller associated with a camera.

The phrase "artificial light" as used herein means electromagnetic radiation from manmade sources.

The phrase "binned sensor" as used herein means an image sensor where electrical signals from two or more adjacent pixels are sampled together.

The word "camera" as used herein means a device for recording images.

The phrase "camera orientation" as used herein means the sensor orientation in an image-capture system at the time of an exposure however or whenever determined.

The word "color" as used herein means the set of physical properties of an object, namely electromagnetic radiation absorption, reflection or emission spectra.

The phrase "controlled light" as used herein means electromagnetic radiation generated by a light source under the influence of an input.

The term "co-polarization" as used herein means emitting electromagnetic radiation from a controlled source in a first polarization angle and receiving reflected electromagnetic radiation at an imaging sensor in the same polarization angle.

The phrase "co-polarized exposure" as used herein means the act of introducing electromagnetic radiation as determined by shutter speed and lens aperture from a controlled source in a first polarization angle and receiving reflected electromagnetic radiation at an imaging sensor in the same polarization angle where the imaging sensor converts the incident electromagnetic radiation to electrical signals in accordance with a present image sensor sensitivity.

The term "cross-polarization" as used herein means emitting electromagnetic radiation from a controlled source in a first polarization angle and receiving reflected electromagnetic radiation at an imaging sensor in a second polarization angle shifted +/−90° from the first polarization angle.

The phrase "cross-polarized exposure" as used herein means the act of introducing electromagnetic radiation as determined by shutter speed and lens aperture from a controlled source in a first polarization angle and receiving reflected electromagnetic radiation at an imaging sensor in a second polarization angle shifted +/−90° from the first polarization angle where the imaging sensor converts the incident electromagnetic radiation to electrical signals.

The phrase "diffuse color" as used herein means the set of physical properties of a subject or subjects of interest as visually perceived by reflection equally in all directions. Visually, this is the dull, not shiny, color isolated from specular reflections.

The phrase "diffuse map" as used herein means a texture map that assigns color to a shader when the shader is processing data within the texture map.

The phrase "digital asset" as used herein means data which is applied in an imaging process in a defined workflow.

The word "exemplary" as used herein means serving as an example, instance, or illustration. Any aspect described herein as "exemplary" is not necessarily to be construed as preferred or advantageous over other aspects.

The word "exposure" as used herein means the act of introducing electromagnetic radiation, as determined by shutter speed and lens aperture, to a sensor that converts the incident electromagnetic radiation to electrical signals in accordance with image-sensor sensitivity.

The word "freestanding" as used herein means not supported physically by a fixed structure or object.

The term "hyper-spectral" as used herein means an image sensor that generates separate electrical signals in response to electromagnetic radiation incident at the sensor in many frequency bands across the electromagnetic spectrum. Frequency bands are not necessarily continuous and do not necessarily include frequencies visible to a human observer. When compared to the frequency bands of a multi-spectral sensor, the frequency bands of a hyper-spectral sensor are smaller and greater in number.

The phrase "image-capture device" as used herein means an apparatus that temporarily stores respective images responsive to cross-polarized and co-polarized light received from a surface or surfaces controllably illuminated.

The phrase "image-based three-dimensional capture device" as used herein means a hardware system employing photography to capture three-dimensional scan data and/or to provide texture data associated with three-dimensional scan data derived from an alternative scanning methodology.

The word "light" as used herein means electromagnetic radiation both visible and non-visible to a human observer.

The term "multi-spectral" as used herein means electromagnetic radiation in at least four specific frequency bands. As used herein the specific frequency bands are not necessarily adjacent to one another, may or may not overlap one another, and may include frequencies visible to a human observer as well as frequencies non-visible to a human observer. When compared to the frequency bands of a hyper-spectral sensor, the frequency bands of a multi-spectral sensor are larger and fewer in number.

The phrase "orientation" as used herein means the location and direction in a three-dimensional coordinate system of an image-capture system.

The word "photogrammetry" as used herein means the science of making measurements from photographs.

The word "polarizer" as used herein means a filter that substantially reduces the passage of electromagnetic radiation in other than a desired plane.

The phrase "projective texture mapping" as used herein is a method of texture mapping that enables a textured image to be projected onto a scene as if by a slide projector.

The phrase "reflected light" as used herein means electromagnetic radiation from any source that is cast back from a surface or sub-surface.

The word "sensor" as used herein means an array of picture elements that generates electrical signals in response to electromagnetic radiation incident at the corresponding picture elements.

The phrase "sensor orientation" as used herein means the location and direction in a three-dimensional coordinate system of an image sensor in an image-capture system at the time of an exposure.

The phrase "specular color" as used herein means the set of physical properties of an object as visually perceived via reflection when the object is illuminated by electromagnetic radiation from a source defined by intensity, frequency, distance, and an angle of incidence relative to the normal surface of an object.

The phrase "specular map" as used herein means a two-dimensional data set that includes specular color from one or more co-polarized exposures or non-polarized exposures.

The word "studio" as used herein means a room where a photographer or videographer works.

The phrase "three-dimensional capture" as used herein means any hardware system used to collect three-dimensional data of an object or a surface in an environment.

The phrase "three-dimensional scene reconstruction from multiple images" as used herein refers to the creation of three-dimensional models from a set of images. It is the reverse process of obtaining two-dimensional images from three-dimensional scenes.

The capture system serves to benefit the need to virtualize human-scale environments, such as residential and commercial real estate, retail spaces, sensitive archeological sites, highly inaccessible locations such as caves, and remote geologic surface features, including distant planets. While 3D capture of exterior environments is also valued, interior spaces are of special interest considering the constraint placed upon capturing texture data by lighting requirements. While windows provide for ambient sunlight, shadows and more generally inadequate levels of ambient sunlight make for problematic conditions in the attempt to record image data purposed either to 3D scene reconstruction from images or to providing textures as used in projective texture mapping wherein a scene reconstruction was derived by an alternate scanning methodology.

The capture system also serves to benefit the need to virtualize objects, such as furniture, decorative objects, and any variety of other objects used to furnish and decorate virtualized environments or serve as props. While prior art can be used to capture textures of objects, the premium placed on portability in capturing environments serves as a double advantage in capturing objects, in light of how impractical it is to transport objects to a studio for capture as disclosed by Debovec. For example, transporting a large piece of furniture to a studio adds considerably to the expense of capture, whereby a portable capture system can more easily travel to and set up at a warehouse or showroom and capture furniture in situ, with no need to even move the furniture from its location within the building. While the system and method disclosed by Cho may be relatively more practical to deploy to capture textures of human-scale environments, Cho is impractical as it would require manually rotating a polarizer with every other image capture, as well as the time consuming activities associated with outputting a video signal used to monitor in real time the effect of changes in cross-polarization and co-polarization to specifically target and dial in extreme states between each type exposure.

Independent of the application, whether for rendering virtual environments, for use in creating or editing a visual effect for broadcast television, cable television, Internet streaming, digital cinema, animations, VR, or video games, dynamic virtual or CG lighting benefits from having as a starting point nearly pure or diffuse color data in a separate channel from that associated with specular color data. The separation of diffuse color data from specular color data enables an image processor to render more realistic representations of a virtual environment when lighting conditions change.

When a light source moves in the real world an observer sees shadows and specular reflections change accordingly. Similarly, when an observer moves in the real world, specular reflections and in the case of partially translucent materials, subsurface scatter changes from the perspective of the observer. Accordingly, it is a benefit when moving a virtual light in a virtual environment for an observer to see shadows and specular reflections shift in accordance with changes in the location and orientation of the virtual light source. Likewise, when the perspective of the virtual observer is changing it is further beneficial for specular reflections, and in the case of translucent materials, for the behaviors of subsurface scatter to change in the virtual representation.

As described in the technological background, photography that is substantially shadow-free using conventional ring strobes alone isn't enough to produce imagery that is well-suited for photogrammetry as specular reflections appearing at different surface normal vectors whenever the camera and strobe assembly change position and orientation challenge a photogrammetry engine searching for common points of interest.

In contrast with conventional systems and as described in the example embodiments, the present image-capture devices combine substantially shadow-free lighting with photography to capture surface textures that can be used to isolate diffuse color data from specular color data. The surface or surfaces of interest at a location to be modeled are illuminated by a light source that provides sufficient light under different polarization states to adequately expose photosensitive elements in an image sensor. A set of diffuse maps may be used with conventional photogrammetry techniques to generate models of a real-world locations or scenes and of objects. Matched images or images of substantially the same subject matter exposed under different lighting conditions are used to generate a modified image. This modified image or isolated-specular surface texture is used as a separate input when rendering a virtual environment from the model. Accordingly, a set of exposures captured at a location or of an object are temporarily stored as image files and processed using an image-processing technique to generate the modified image. An example of such an image-processing technique is described in U.S. application Ser. No. 14/953,615, filed on Nov. 30, 2015 and titled "Systems and Methods for Processing Image Information" the contents of which are incorporated herein by reference.

Light emitted from an improved image-capture device substantially reduces and for some textures virtually eliminates shadows in the color information. An illumination source and controller operate in response to one or more signals from the image-capture device to illuminate a surface or surfaces of interest with a first polarization state such that reflected light incident at an optical subsystem of the image-capture system passes through an open shutter and reaches an image sensor where the light is converted to electrical signals that are temporarily stored (e.g., in an image file). In addition, the illumination source and controller illuminate the same surface or surfaces of interest with light having a second polarization state and power level different from the first polarization state and power level. The first polarization state and the second polarization state are examples of a desired polarization state.

An improved image-capture device includes an illumination source having separately energized light emitters. The light emitters are adjacent to a lens housing. When a first light emitter is energized, light oscillating in a first orientation is directed away from the image-capture device. When a second light emitter is energized, light oscillating in a second orientation, different from the first orientation, is directed away from the image-capture device.

Such an improved image-capture device further includes a sensor arranged to convert reflected light to electrical signals responsive to characteristics of the reflected light and a controller. The controller is in communication with the optical subsystem and the sensor. The controller coordinates operation of the optical subsystem and the illumination source such that an interval between a first exposure of the sensor to light oscillating in the first orientation directed away from the image-capture device and reflected by a subject of interest and a second exposure of the image sensor to light oscillating in the second orientation directed away from the image-capture device and reflected by the subject of interest is controlled.

In an example embodiment, the interval between the first exposure and a second or subsequent exposure results in a first raster of image information and a second raster of image information where the first raster and second raster include substantially similar image information. In such an example, the image information in the first raster and the image information in the second or subsequent raster are responsive to substantially the same orientation of the optical subsystem.

In an example embodiment, the controller generates a signal that when received at the illumination source, directs the illumination source to modify one of the first orientation or the second orientation.

In an example embodiment, the controller generates a signal that when received at the illumination source, directs the illumination source to modify an illumination power. When the light emitter or light emitters are semiconductor devices, the illumination power can be controllably adjusted by modifying the magnitude of a bias current.

In an example embodiment, the first light emitter and the second light emitter are arranged circumferentially about a lens housing of the optical subsystem. In such examples, a distance along a plane substantially orthogonal to a longitudinal axis of a lens housing between nearest neighbor semiconductors is determined by a minimum tolerance associated with a manufacturing process. Furthermore, in such examples the first and second light emitters are arranged with respect to the lens housing such that emitted light is prevented from entering the lens without contacting a surface of a subject of interest.

In an example embodiment, the first light emitter and the second light emitter are further arranged to prevent emitted light from the first emitter from passing through a polarizer filter associated with the second light emitter and respectively to prevent emitted light from the second emitter from passing through a polarizer filter associated with the first light emitter.

In an example embodiment, the illumination source emits white light.

In an example embodiment, the illumination source emits invisible light.

In an example embodiment, the illumination source emits hyperspectral light.

In an example embodiment, at least one of the first light emitter and the second light emitter are formed from a ring of elements. Such a ring of elements is arranged concentrically about a lens housing of the optical subsystem.

In alternative embodiments, at least one of the first light emitter and the second light emitter include elements arranged in more than one ring surrounding a lens. In such embodiments, a first substrate supports one or more ring of elements, while a second substrate supports a respective one or more ring of elements. In these embodiments, the first substrate is offset from the second substrate in a dimension parallel to the longitudinal axis of the lens housing of the optical subsystem. In some of these embodiments, the offset may be selected such that an emitting surface of the respective elements distributed across a first ring and a concentric ring are substantially coplanar. While described herein as separate substrates, it should be understood that a single substrate with first and second substantially parallel surfaces can be used to support one or more rings of elements wherein emitting surfaces of the respective elements are substantially coplanar.

In an example embodiment, the illumination source directs light oscillating in two orientations substantially orthogonal to one another away from the image-capture device, the light forming an angle of incidence with respect to a longitudinal axis of a lens housing of the optical subsystem of less than about 2.5 degrees when reflected by a subject of interest separated by at least one meter from the image-capture device.

In an example embodiment, the sensor includes semiconductors responsive to hyperspectral electromagnetic radiation.

In an example embodiment, the sensor is nonplanar.

In an example embodiment, the first orientation is substantially orthogonal to the second orientation. Light oscillating in one of the first orientation or the second orientation may be responsive to a respective feature of one of the first light emitter or the second light emitter. Alternatively, light oscillating in one of the first orientation or the second orientation may be responsive to either a first polarizer located between the first light emitter and a subject of interest or a second polarizer located between the second light emitter and the subject of interest, respectively.

In an example embodiment, the optical subsystem includes a polarizer configured substantially orthogonal to reflected light oscillating in one of the first orientation or the second orientation and substantially parallel to light oscillating in the remaining one of the first orientation or the second orientation.

For example, when a polarizer is configured substantially parallel to reflected light oscillating in one of the first orientation or the second orientation, a relatively lower illumination power is provided to illuminate the subject-of-interest during one of the paired or related image exposures. When a polarizer is configured substantially orthogonal to reflected light oscillating in one of the first orientation or the second orientation, a relatively larger illumination power is provided to illuminate the subject-of-interest (e.g., a surface or surfaces) during the remaining one of the paired image exposures.

In an alternative embodiment, an improved image-capture device includes an enclosure including two or more image sensors, an optical subsystem supported by the enclosure and an illumination source. The optical subsystem includes two or more lenses that receive reflected light from a subject of interest. The reflected light is directed along first and second optical paths. The first and second optical paths encounter a respective polarizer and are arranged such that reflected light that passes through a first polarizer is substantially orthogonal to reflected light that passes through a second polarizer. In this alternative embodiment, at least one image sensor intersects the first optical path and at least one separate image sensor intersects the second optical path.

In an example arrangement, the alternative embodiments briefly described in the preceding paragraph may be augmented by a beamsplitter arranged such that light in the first optical path traverses the beamsplitter and light in the second optical path is reflected by the beamsplitter.

In the above described alternative embodiments, the illumination source and the optical subsystem are arranged to prevent emitted light from entering the optical subsystem without contacting a surface of a subject of interest.

In the above described alternative embodiments, the illumination source comprises semiconductors arranged about a surface of the enclosure.

In the above described alternative embodiments, emitted light directed away from the enclosure of the image-capture device is orthogonally polarized with respect to a polarization angle of reflected light that intersects at least one image sensor.

In the above described alternative embodiments, a first image sensor intersecting the first optical path captures a first image and a second image sensor intersecting the second optical path captures a second image such that the first image and the second image are captured at a first time. Alternatively, a first image sensor intersecting the first optical path captures a first image at a first time and a second image sensor intersecting the second optical path captures a second image at a second time different from the first time.

The elapsed time between a first exposure and a second or subsequent exposure may be controlled by the image-capture device. That is, the controller synchronizes operation of the illumination source with the various electro-mechanical elements of the optical subsystem and a sensor to generate a first exposure. Independent of the sequence, a first exposure is the result of illumination of a subject-of-interest as the result of a first illumination power and a second exposure is the result of illumination of substantially the same subject of interest illuminated as the result of a second illumination power where the second illumination power is not necessarily the same as the first illumination power. In some embodiments, the illumination controller may be arranged to electronically enable or adjust a polarizer arranged in a path between a controlled light source and the scene-of-interest. Such an electronically enabled adjustment may be applied to leverage the entire amount of available light.

In a preferred embodiment, whether the two exposures are co-polarized or cross-polarized, reflected light reaches the sensor in both exposures, and absent very fast relative movement between the subject matter being imaged and the image-capture device, the paired images include substantially the same subject matter across the raster of pixels stored in separate image files.

In another alternative embodiment, an improved image-capture device includes an enclosure, light emitters, and first and second sets of image sensors. The light emitters and the first and second sets of image sensors are arranged along a surface of the enclosure. The light emitters direct light away from the enclosure in a direction substantially orthogonal to the surface of the enclosure. This directed light is oscillating in a first orientation. The first set of image sensors receives reflected light oscillating in the first orientation. The second set of image sensors receives reflected light oscillating in a second orientation that is substantially orthogonal to the first orientation.

In the alternative embodiment described in the preceding paragraph, the light emitters are offset from the first and second sets of image sensors to prevent light originating at the light emitters from directly contacting the first and second sets of image sensors.

The image-capture device described immediately above may be further augmented by a third set of image sensors arranged to receive reflected light oscillating in more than one orientation.

In an alternative embodiment, an image-capture system could be arranged with paired cameras. In such an arrangement a single camera orientation would apply to the image pairs and would provide optimal inputs for a difference blend operation to isolate specular reflections from diffuse color. A single emitter could be used in conjunction with a film polarizer to illuminate a subject-of-interest with polarized light. A first camera may receive the reflected light after it is further redirected by a beamsplitter. A second or "through-path" camera is provided after the beamsplitter. A polarizer may be provided before the image sensor in the through-path camera to partially balance the incident or reflected light lost in the beam splitting process. The use of multiple image sensors and a beamsplitter increases production costs and design complexity and likely introduces a calibration to balance the corresponding image pairs. However, if the image sensors shifted out of alignment, a global fix could be applied to the paired images.

Images that include subject matter that was captured with a cross-polarized lighting condition or a cross-polarized exposure provide a first two-dimensional data set or diffuse map that includes substantially shadow-free diffuse color. The image information stored as a result of the cross-polarized exposure is substantially shadow free when the reflected light from a controlled light source is nearly on-axis with the sensor that captures the cross-polarized image. In addition, the cross-polarized exposure or the image that results from such an exposure is substantially free of specular color or the shiny color that results from reflectance that is free of specular color. At one end of the spectrum, the more obvious example of specular color is the shiny color in an image that results from reflectance off highly smooth surfaces. Such an image includes no discernible bright or shiny spots generally white in color that result from a mirror like reflection of a broad range of the visible spectrum that encounters a surface or surfaces captured in the image. At the other end of the spectrum, there's the pure matte surface property than only reflects diffuse color, and then there's the less obvious range of specular reflectance property found in materials, this entire range of specular behavior associated with varying micro-surface roughness ending in pure glossy specular reflection, this range characterized by what's commonly understood to comprise the specular hardness value associated with a particular specular reflection.

Images that include subject matter captured with a co-polarized lighting condition or co-polarized exposure provide a separate two-dimensional data set or specular map with substantially shadow-free specular color. The image information stored as a result of the co-polarized exposure is substantially shadow free when the reflected light from a controlled light source is nearly on-axis with the sensor that captures the co-polarized image. The paired images are stored in a memory in the improved image-capture system.

The present image-capture devices can be adapted and applied to a freestanding system for recording images of real-world scenes or objects under controlled lighting conditions. Such a freestanding image-capture device may be hand-held; temporarily attached to an adjustable pole; supported from above by way of a harness; suspended by a carriage or member arranged on an elongate flexible member, such as, a cable, wire, filament, rope, etc., supported by respective poles or other structures; temporarily integrated with a land-based vehicle, a floating or buoyant vehicle, an underwater vehicle, a lighter than air vehicle or even integrated on other types of aerial vehicles. Accordingly, an image-capture device consistent with the present principles and techniques is not necessarily stationary and can be in motion.

The present image-capture devices can be used to forward a set of diffuse images to a photogrammetry engine to generate a dense surface mesh, which after post-processing delivers a render mesh. The render mesh includes a three-dimensional model of the geometry of the subject matter captured in the images and a set of UV maps. The render mesh is used with camera orientation information and the surface textures to create corresponding diffuse maps. The render mesh and the diffuse maps are inputs that can be used by an image processor to create a three-dimensional color representation of the subject matter captured in the images.

Alternatively, the described image-capture devices can be applied in conjunction with structured light, sonar (sound navigation and ranging), LiDAR (a portmanteau of "light" and "radar"), light-field camera technology, and other scanning methods to leverage camera projection mapping to produce information models to support the creation of more realistic virtual environments that adapt to changes in point of view, changes in position of a virtual or CG light source and for some environments changes in position of the sun.

These other scanning methodologies may supplant the role of a photogrammetry engine in solving for camera orientation, performing bundle adjustment, and surface reconstruction in their respective ways.

The present image capture techniques can be adapted and applied to images captured with conventional digital image sensors, binned sensors, multi-spectral sensors and even hyperspectral sensors, as may be desired.

The present image-capture devices can be applied to collect images of an outdoor location, an indoor location where ambient light is controllably disabled, a location with restricted access, or even an underwater or subterranean location. It can also be applied to collect images of objects that are either difficult or costly to transport to a studio, are sensitive archaeological artifacts, or pose any other type of constraint against movement within or from a present location. Any of the mentioned locations or objects may be captured in images using the described image-capture devices. The captured images may be applied as inputs in image-processing techniques to generate a virtual representation of a real-world scene or objects for use as an input to an editing tool. Such an editing tool can be used to modify a scene or used as props that may be integrated in a movie, television show or other cinematic production broadcast or distributed on a storage medium. These products may be stored and distributed in digital formats or via other media such as film. In addition, any of the mentioned locations may be used to generate a virtual environment or object used in an exhibit, as a training aide, or in the development of a video game.

The various aspects will be described in detail with reference to the accompanying drawings. Wherever possible, the same reference numbers will be used throughout the drawings to refer to the same or like parts. References made to particular examples and implementations are for illustrative purposes, and are not intended to limit the scope of the inventive systems as defined in the claims.

FIG. 1 is a schematic diagram illustrating the electromagnetic spectrum. The electromagnetic spectrum 10 includes the range of wavelengths or frequencies over which electromagnetic radiation extends. As illustrated, the electromagnetic spectrum 10 is commonly described by wavelength, a wave name, and/or frequency. The abscissa 11 includes a scale ranging from about 10 meters to about $10^{-14}$ meters. The abscissa 11 depicts a decreasing wavelength from left to right across the diagram. Conversely, the abscissa 12 depicts an increasing frequency from left to right across the diagram. The abscissa 12 includes a scale ranging from about $10^8$ to $10^{22}$ Hertz (Hz).

Moving from left to right across the electromagnetic spectrum 10 waves names include radio, microwave, infrared, ultraviolet, X-rays and Gamma-rays. As indicated, by a corresponding horizontal two-headed arrow, each of the wave names corresponds to a range of the electromagnetic spectrum 10 that corresponds to a range of wavelengths and a range of frequencies. As also shown in FIG. 1 not all wave names correspond to a distinct and separate portion of the electromagnetic spectrum 10. For example, microwaves overlap both radio waves and infrared waves. By way of further example, X-ray waves or simply X-rays overlap both ultraviolet waves and Gamma-ray waves or simply Gamma-rays.

Between the infrared and ultraviolet waves lies a range of the electromagnetic spectrum 10 that includes visible light 13. As illustrated, visible light 13 for a typical human observer ranges from about a wavelength of 780 nanometers (nm), which corresponds to the color red to a wavelength of about 390 nm, which corresponds to the color violet. These wavelengths correspond to a frequency band or frequency range in the vicinity of about 430 THz ($10^{12}$ Hz) to 770 THz. Some human eye-brain systems may respond to electromagnetic waves below 390 nm, while some other human eye-brain systems may not respond at all at those wavelengths. Similarly, some human eye-brain systems may respond to electromagnetic waves above 780 nm, while some other human eye-brain systems may not respond at those wavelengths.

Technically, light does not have a color. Light is simply an electromagnetic wave with a specific wavelength or a mixture of wavelengths. An object that is emitting or reflecting light appears to a human to have a specific color as the result of the eye-brain response to the wavelength or to a mixture of wavelengths. For example, electromagnetic waves with a wavelength of between about 580 to 595 nm appear yellow to most humans. In addition, a mixture of light that appears green and light that appears red appears to be yellow to most humans. When electromagnetic waves having a broad range of wavelengths between about 390 nm to 780 nm enter a human eye, most humans perceive "white" light.

Non-visible or invisible light corresponds to those portions of the electromagnetic spectrum 10 outside of the range of visible light 13. More specifically, a first non-visible range includes electromagnetic radiation with wavelengths longer than about 700 nm or frequencies of less than about 430 THz. This first non-visible range includes, for example, infrared, microwave and radio waves. A second non-visible range includes electromagnetic radiation with wavelengths shorter than about 390 nm or frequencies greater than about 770 THz. This second non-visible range includes, for example, ultraviolet, X-rays and Gamma-rays.

Figure 2:
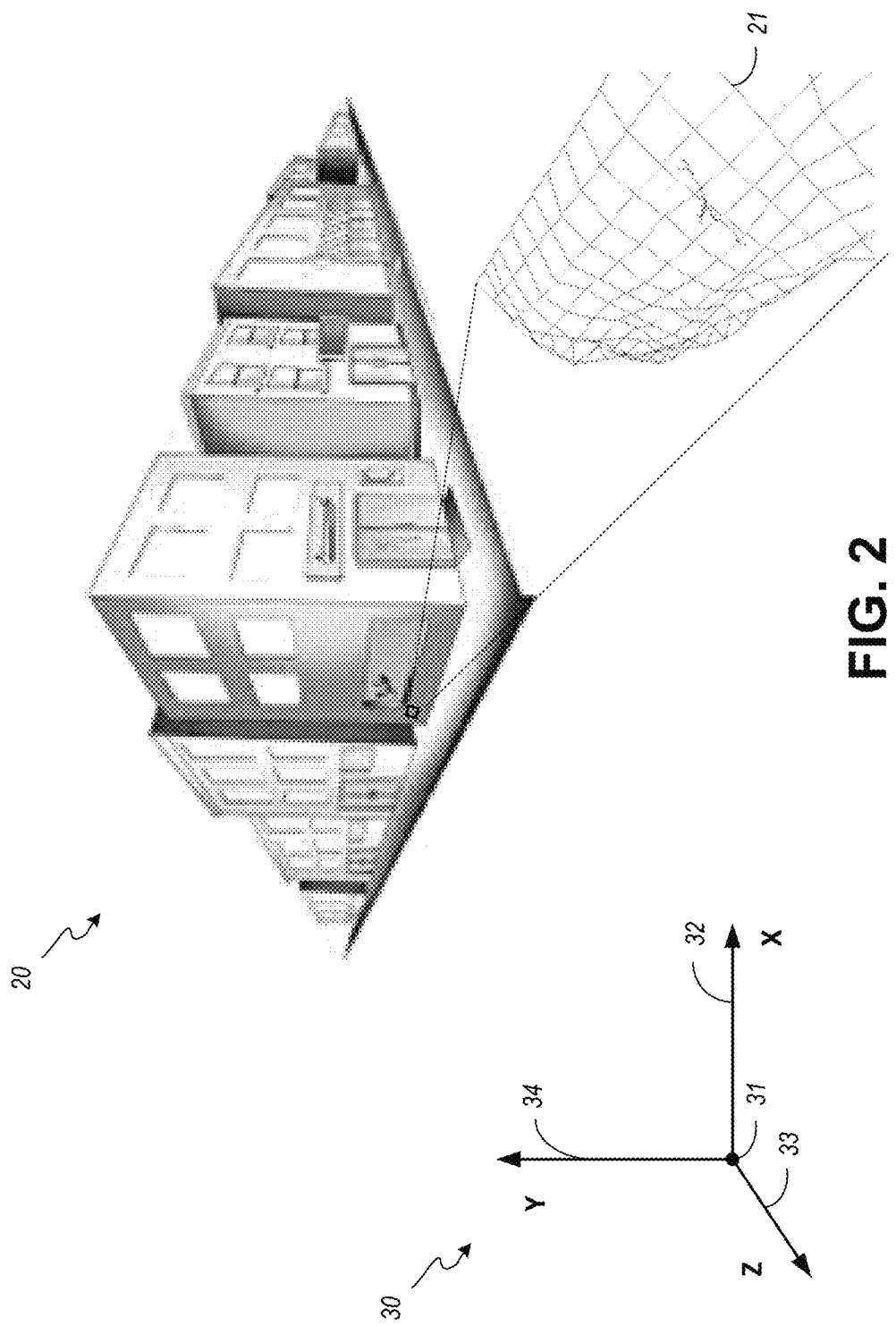
FIG. 2 is a schematic diagram illustrating an exemplary real-world scene to be recorded with an image-capture device using novel image-capture techniques.

FIG. 2 is a schematic diagram illustrating an exemplary real-world scene 20 to be recorded with an image-capture device using novel image-capture techniques. The example real-world scene 20 is a junction of two streets in a city bordered by man-made structures such as two and three story buildings. The various structures and features of the real-world scene 20 can be defined in a three-dimensional coordinate system 30 or three-dimensional space having an origin 31, an abscissa or X-axis 32, an ordinate or Y-axis 34, and a Z-axis 33.

In the illustrated embodiment, the three-dimensional coordinate system 30 is a right-handed coordinate system. In a right-handed coordinate system the positive x and y axes point rightward and upward across the two-dimensional page and the negative z axis points forward or into the depicted scene. Positive rotation is counterclockwise about the axis of rotation.

It should be understood that alternative coordinate systems, such as a left-handed coordinate system or a spherical-coordinate system (both not shown) may be used to develop a three-dimensional model of features in a real-world scene 20. While the origin 31 is not overlaid or associated with a physical feature in the illustrated real-world scene 20, such an association is convenient and may be preferred. For example, if a surveyor's pin or other boundary marker is available, the surveyor's pin or marker may be adopted as the origin 31 for the three-dimensional volume to be modeled.

Whatever coordinate system is used and whatever feature or features may be used to define an origin, the process of developing the model of a real-world scene or location may benefit from a preliminary mapping of a space to plan an effective strategy for positioning and collecting images. Such a preliminary mapping may create a route or course that traverses the three-dimensional volume. The route or course may include a flight plan to guide one or more aerial platforms to position an image-capture device as images are being exposed and stored. Such a preliminary investigation and plan may be used to define and extend the bounds of a known space into an unknown space, such as with a manned or unmanned original exploration of underwater features like a shipwreck or subterranean features such as a cave.

As further illustrated by way of a relatively small insert near a lower leftmost corner of a building that faces both streets, a material used on the front of the building (e.g., concrete, granite, brick, etc.), which may include large enough surface variation to be measured by a photogrammetry engine, is represented by a localized three-dimensional polygonal mesh 21. The polygonal mesh 21 is an arrangement of adjacent polygons, the vertices of which are defined by a point cloud. In the illustrated embodiment, the point cloud is represented by vertices of some of the various polygons. Each of the vertices or points in the point cloud is identified by coordinates in a three-dimensional coordinate space or by a vector and a distance from a reference, such as, origin 31, in a modeled volume. Since every point is identified by coordinates in the three-dimensional coordinate space, each polygon or closed area in the polygonal mesh 21 can be identified by its vertices or by a normal vector derived from the plane of the surface defined by the vertices.

In the illustrated embodiment, a surface construction or reconstruction process has been performed. Such a surface reconstruction uses the locations defined by the points of the point cloud to define a three-sided polygon or triangle. Alternative surface reconstruction algorithms may use four points from the point cloud or other collections of points greater in number to represent surfaces of features in a real-world scene 20. However, surfaces represented by triangles and quadrilaterals are generally preferred. The closed areas of sub-portions of a polygonal mesh 21 are often associated with a two-dimensional unfolded version of the corresponding surface geometry. These two dimensional representations are commonly called UV maps. The letters "U" and "V" denote axes of a two-dimensional texture. When matched or projected with appropriate color and relatively finer texture information in proper registration with the surface geometry over the entirety of the surfaces in the polygonal mesh 21 a three-dimensional color model of the real-world scene 20 is created.

From the above it should be understood that photogrammetry techniques are used to generate a model of the relatively large scale geometry that photogrammetry techniques can measure. That model is then used as a framework for locating and folding the color and relatively finer variations in surface textures as captured in two-dimensional photographs to generate a more realistic appearing three-dimensional model of a real-world scene or location. This first improved three-dimensional color model is constructed solely from diffuse maps.

The same relatively large scale geometry is used to locate and unfold a modified two-dimensional image generated from an algorithmic combination of color information from related photographs of nearly the same subject matter that includes a specular map isolated from the diffuse image dataset. The addition of the isolated-specular surface texture as a separate digital asset further improves the realistic response to CG or virtual light in a virtual environment rendered from the three-dimensional color model.

Figure 3:
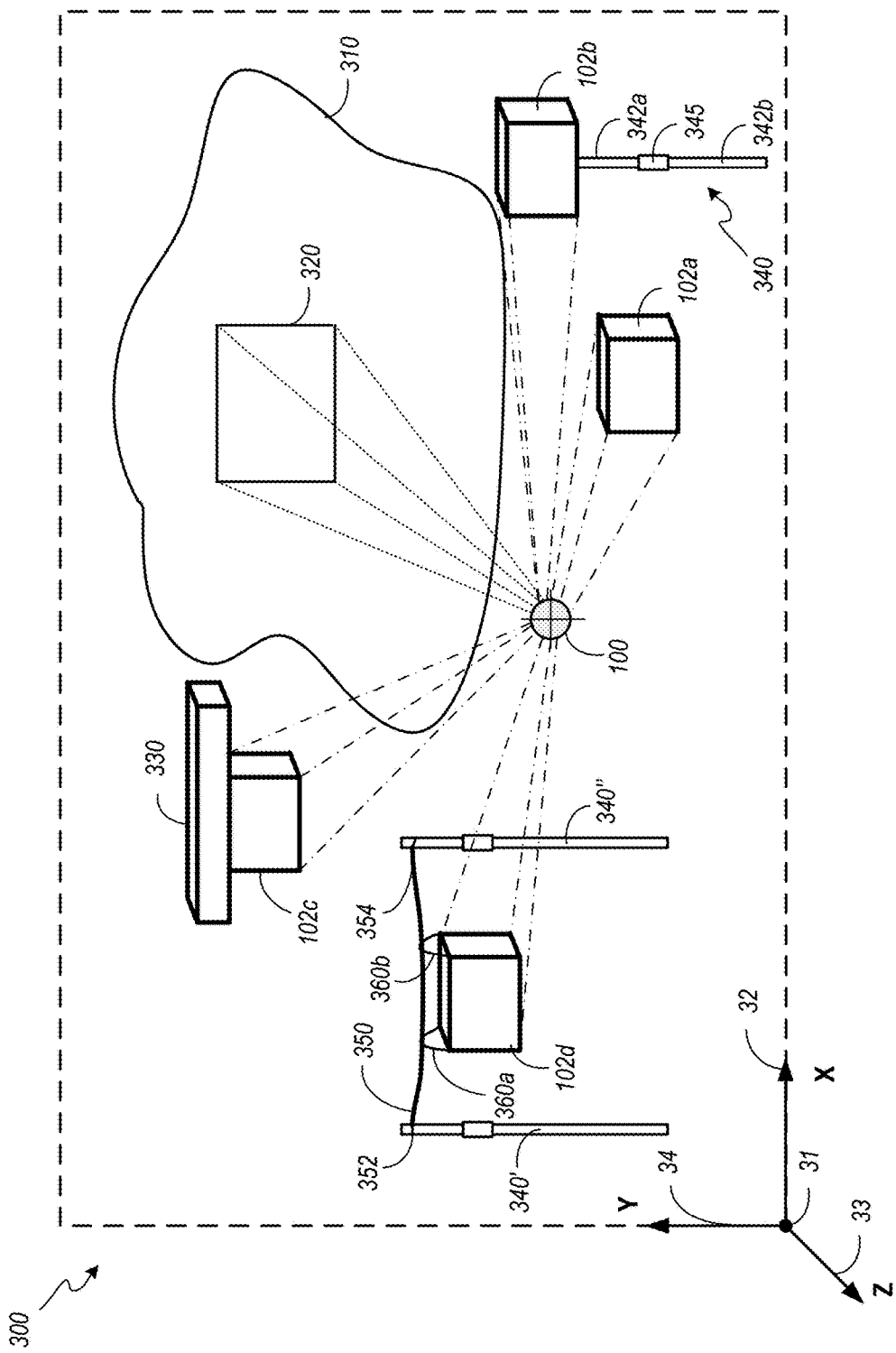
FIG. 3 is a schematic diagram illustrating an image-capture device within a real-world scene including a surface-of-interest.

FIG. 3 is a schematic diagram illustrating an image-capture device 100 within a portion of a real-world scene 300 including a subject-of-interest 310. In the illustrated example, the image-capture device 100 uses an alternative scanner to project an image frustum 320 on the subject-of-interest 310. The image frustum 320 provides distance, orientation, and location information that can be used by an operator or photographic processing systems in the image-capture device 100 to identify the location in the real-world scene 300 where images are to be captured. Although the subject matter captured in an image is described above as including a subject-of-interest 310 it should be understood that the image-capture device 100 is capable of recording images that include a desired portion of a real-world scene 300 that may include multiple surfaces of one or more objects present in a field of view when the image is exposed and temporarily stored in the image-capture device 100.

The image-capture device 100 is arranged in a freestanding chassis or enclosure 102. In a first embodiment the freestanding chassis 102a is moved throughout the real-world scene 300 by an operator. In this first embodiment, the freestanding chassis 102a is representative of a handheld mode of operation where device translation and rotation are determined for each exposure. Although the image-capture device 100 is described above as being arranged within a freestanding chassis 102a it should be understood that the image-capture device 100 in some embodiments may be arranged with elements and control interfaces that may extend to or beyond the chassis. For example, one or more of a battery, an illumination source, a lens assembly, etc. may extend from or be coupled to the freestanding chassis 102. When a separate battery pack is desired, one or more elements or subsystems of or the entire image-capture device 100 may be connected by way of a cable or set of wires to one or more batteries (not shown).

In an alternative embodiment, the freestanding chassis or enclosure 102b is coupled to an adjustable extension pole 340. A two section pole is illustrated. However, a pole with additional sections or pole segments that connect to each other can be used. The extension pole 340 includes a section 342a, a portion of which can be stored within a volume enclosed within section 342b and a portion of which can be extended from section 342b. An adjustment sleeve 345 uses friction forces along the longitudinal axis of the section 342b and section 342a to temporarily set the distance between an opposed or support end of the section 342b and the connection end of section 342a connected to or placed against a receiver portion along a surface of the freestanding chassis 102b of the image-capture device 100. The adjustment sleeve 345 can be manipulated (e.g., rotated) to reduce the radial forces being applied against the external surfaces of sections 342a, 342b when an operator desires to adjust the length of the extension pole 340.

In operation, with a desired length temporarily set or fixed by the adjustment sleeve 345, the opposed or support end of the extension pole 340 can be placed on the ground or another surface capable of supporting the weight of the combination of the extension pole 340 and the image-capture device 100 within the freestanding chassis 102b. The pole 340 can be held by an operator to prevent rotation. Alternatively, the pole 340 can be supported by a set of three or more guy wires (not shown).

In an alternative embodiment, the freestanding chassis or enclosure 102c is coupled to a vehicle 330. A drone is depicted schematically in an airborne mode of operation. A drone is one example of an airborne vehicle. Other airborne vehicles could be used to support the freestanding chassis 102, as may be desired. In other embodiments, the vehicle 330 can be a land-based vehicle, a boat or other buoyant vehicle that operates on or near the surface of a body of water, a submarine that operates near or below a surface of a body of water, etc. One or more such vehicles can be operated to assist in the relative positioning of the image-capture device 100 with respect to a subject-of-interest 310 to be photographed.

In another alternative embodiment, the freestanding chassis or enclosure 102*d* is arranged with carriage supports 360 that hang below an elongate flexible member 350 between pole 340' and pole 340". In the illustrated arrangement, carriage support 360*a* is connected near the upper leftward facing side of the freestanding chassis 102*d* and carriage support 360*b* is connected near the upper rightward facing side of the freestanding chassis 102*d*. The elongate flexible member 350 passes through a respective opening in the carriage supports 360. The elongate flexible member 350 can be a wire, filament, rope, cable or cord that is temporarily connected at one or both of a first end 352 at pole 340' and at a second end 354 at pole 340". The respective lengths of the pole 340' and the pole 340" can be adjusted to account for uneven terrain.

When so arranged, the freestanding chassis 102*d* may be maneuvered laterally with respect to a subject-of-interest 310 in a real-world scene 300. Such maneuvering can be accomplished by applying an external force to the freestanding chassis 102*d* with a hand, another pole, and or by attaching a string, rope, wire or cable to one of the carriage supports 360 or to the freestanding chassis 102*d* and pulling the same to adjust the relative position of the freestanding chassis 102*d* between the poles 340', 340". Alternatively, the carriage support 360*a* and the carriage support 360*b* may be suspended from a respective set of rollers arranged to contact opposed portions along the surface of the elongate flexible member 350. One or both the respective sets of rollers may be electromechanically driven by a remotely controlled system to position the image-capture device 100 within the freestanding chassis 102*d* as may be desired between the pole 340' and the pole 340".

Whether the image-capture device 100 is handheld, connected to a pole or poles, suspended from a lighter than air vehicle, suspended from a cable supported between poles, suspended by wires or ropes from a man-made or natural surface, or connected to a vehicle, an image sensor or image sensors in the image-capture device 100 may not be stationary and in some modes of operation is necessarily non-stationary.

When the image-capture device 100 is handheld, an operator can adjust any function using interfaces and mechanisms for making such adjustments. When the image-capture device 100 is connected to a pole 340, suspended from a lighter than air vehicle, suspended via wires or ropes from a man-made or natural surface, or connected to a floating or land-based vehicle, a wired or wireless interface may be used by an operator to enter adjustments as may be desired as the image-capture device 100 is maneuvered about the real-world scene 300.

Figure 4A:
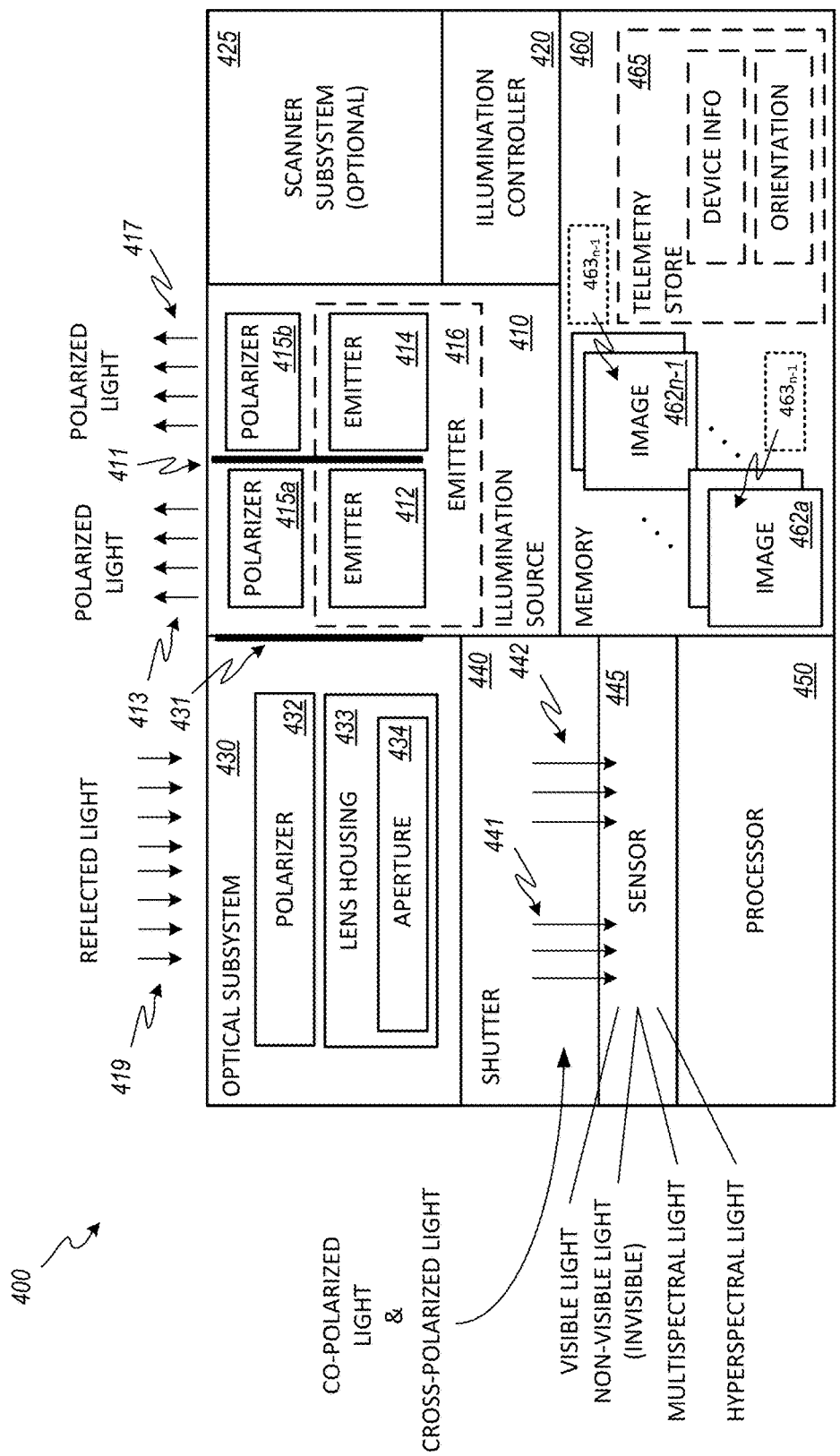
FIG. 4A is a schematic diagram of an embodiment of the image-capture device of FIG. 3.

FIG. 4A is a schematic diagram of an embodiment of the image-capture device 100 of FIG. 3. As illustrated, the image-capture device 400 is an assembly of subsystems including an illumination source 410, illumination controller 420, an optional scanner subsystem 425, optical subsystem 430, shutter 440, processor 450 and memory 460. The processor 450 is arranged to manage and coordinate the operation of the various mechanical and electro-mechanical subsystems in the image-capture device 400 and any peripheral systems, such as a battery or batteries, which energize the various components. The processor 450 can be enabled by a "system-on-chip" or SoC which includes a set of interconnected electronic circuits typically, but not exclusively, including a hardware core, a memory, and a communication interface. A hardware core may include a variety of different types of processors, such as a general-purpose processor, a central processing unit (CPU), a digital signal processor (DSP), an auxiliary processor, a graphical processing unit, among other circuits. A hardware core may further embody other hardware and hardware combinations, such as a field programmable gate array (FPGA), an application-specific integrated circuit (ASIC), other programmable logic device, discrete gate logic, transistor logic, performance monitoring hardware, etc.

The processor 450 may operate autonomously, in response to one or more inputs received from an operator and or in conjunction with information received from scanner subsystem 425. The scanner subsystem 425 may include a remote sensing technology such as LiDAR which measures distance by illuminating a target with a laser and analyzing the reflected light. Such distance information can be applied by the processor 450 to set one or more operational parameters such as a focus adjustment, aperture, image sensor sensitivity, shutter speed. In addition, such distance information can be useful in guiding the position of the image-capture device 400 as it traverses the real-world scene 300.

Furthermore, the scanner subsystem 425 may be adapted to provide a point cloud 21 and/or a polygonal mesh from the distance information which can be stored in one or more data files in telemetry store 465. Alternatively or in addition to LiDAR, the scanner subsystem 425 may include a system that projects a known pattern onto a subject or surface of interest and uses a mathematical reconstruction of any deformation in the reflected pattern. When a subject having a surface-of-interest is observed from multiple angles, the various reconstructions can be used to identify common features to stitch scanned portions of a scene together or to maneuver the image-capture device 400 along a predetermined course or path through a previously scanned location of interest.

However embodied, the processor 450 is arranged to generate and communicate a control signal or set of control signals at appropriate times to the illumination controller 420. In turn, the illumination controller 420 enables the emitter 416 which generates and emits controlled light in a direction substantially orthogonal to an external or mounting face of the image capture device 400. Controlled light is polarized in one or more desired polarization angles.

As illustrated schematically in FIG. 7A and in FIG. 7B, a polarizer or polarizing filter 710, 715 substantially reduces the passage of electromagnetic radiation or light 700 in other than a desired plane. Light 700 is shown as a pair of two-headed arrows 702, 704 that represent respective traveling waves that oscillate about their intersection at point 705. In the illustrated arrangement, light 700 (or the traveling wave) is traveling into or out from the page at the intersection 705 of arrow 702 and arrow 704. Schematically, the "+" sign represents an arrangement of the polarizing filter 710 in registration with the intersection 705 of the two-headed arrows 702, 704. That is, the polarizing filter 710 may be placed in front of a light beam 700 or ray traveling in a direction out of the page or towards an observer. When so arranged, the polarizing filter 710 prevents the passage of light 700 oscillating in any other orientation than vertical (up and down the page) beyond the polarizing filter 710. Stated another way, polarizing filter 710 allows polarized light 720, which is oscillating vertically or along a plane identified schematically as being parallel with a line defined by 90° and 270° labels along a unit circle 722.

Similarly, in FIG. 7B, light 700 is polarized by placing a polarizing filter 715 that is arranged to allow passage of light 700 oscillating horizontally in registration with the light 700. That is, the polarizing filter 715 may be placed in front of a light beam 700 or ray traveling in a direction out of the page or towards an observer. When so arranged, the polarizing filter 715 prevents the passage of light 700 oscillating in any other orientation than horizontal (left and right across the page) beyond the polarizing filter 715. Stated another way, polarizing filter 715 allows polarized light 725, which is oscillating horizontally or along a plane identified schematically as being parallel with a line defined by the 0° and 180° labels along a unit circle 727. When deployed as depicted in FIG. 7A and FIG. 7B, the polarizing filter 710 allows polarized light 720 oscillating in a first orientation or plane to pass and polarizing filter 715 allows polarized light oscillating in a second orientation or plane orthogonal with respect to the first orientation to pass.

In the embodiment illustrated in FIG. 4A, the emitter 416 is a composite element that includes a first emitter 412, which generates and directs non-polarized light through a polarizer 415a and further includes a second emitter 414, which generates and directs non-polarized light through a polarizer 415b. The polarizer 415a and the polarizer 415b and at least a portion of the first emitter 412 and the second emitter 414 are separated by an opaque barrier 411 that prevents light from the first emitter 412 from passing through the polarizer 415b and similarly prevents light from the second emitter 414 from passing through the polarizer 415a. Polarized light 413, or light that passes beyond the polarizer 415a that is oscillating in a first orientation, is directed away from the image-capture device 400 toward a surface-of-interest 310 in a real-world scene 300. Similarly, polarized light 417 that passes beyond the polarizer 415b that is oscillating in a second orientation is directed away from the image-capture device 400 toward a surface-of-interest 310 in a real-world scene 300. The polarizer 415a and the polarizer 415b are arranged so that the polarized light 413 and the polarized light 417 are substantially orthogonal with respect to the other. The polarized light 413 and the polarized light 417 are reflected by the subject-of-interest 310. In addition, an opaque barrier 431 prevents the polarized light 413 and the polarized light 417 from entering the optical subsystem 430 without reflecting from a surface or object of interest. As indicated schematically in FIG. 4A, reflected light 419 from the surface-of-interest 310 and responsive to the incident polarized light 413 and incident polarized light 417 is received by the optical subsystem 430.

The optical subsystem 430 includes a polarizer 432, lens housing 433 and aperture 434. The aperture 434 is a diaphragm that controls the size of an opening that permits the reflected and polarized light to pass through the shutter 440 on its way to the image sensor 445. A lens (not shown) within the lens housing 433 focuses the reflected light 419 at the image sensor 445. The polarizer 432 reduces the amount of light incident upon the lens housing 433 by permitting light having a specific polarization state or oscillating orientation to pass through and substantially reducing reflected light 419 present at a surface of the polarizer 432 having polarization states other than the specific polarization state. When the polarizer 432 is arranged to allow light oscillating in an orientation that is within a few degrees of an orientation defined by one of the polarizer 415a or the polarizer 415b (when the polarizer 415a has an orientation that is approximately orthogonal or shifted 90° to the orientation of the polarizer 415b) and when both the emitter 412 and the emitter 414 are energized together, and the shutter 440 is opened, the sensor 445 is exposed to co-polarized light 441 and cross-polarized light 442. Alternatively, when the illumination controller 420 directs the illumination source to energize one of the emitter 412 or the emitter 414, and when the shutter 440 is opened, the sensor 445 is exposed to either co-polarized light 441 alone or cross-polarized light alone 442.

When the image sensor 445 is sensitive to visible light, the image sensor 445 generates electrical signals corresponding to the amount of electromagnetic radiation in each of the red, green, and blue frequency ranges. The electrical signals are composited and stored in a uniform manner in memory 460 as an image 462a. The shutter 440 and aperture 434 are opened and closed as directed by control signals generated in and communicated from the processor 450. These control signals are coordinated with the signal or signals communicated to the illumination controller 420 to ensure that the subject-of-interest 310 is sufficiently illuminated and a suitable image is captured and stored in the memory 460. In close proximity to this first exposure and capture of the image 462a, the processor 450 generates a signal or signals that direct the illumination controller 420 to enable the other of the emitter 412 or the emitter 414.

The polarizers 415a, 415b may be linear polarizers embodied in a film. Alternatively, polarization may be controlled in specially constructed light emitting diodes. Alternatively, one or both polarizers 415a, 415b can be embodied with a set of laminated plates. The plates include glass substrates with electrodes, and a nematic liquid crystal layer between the electrode layers. Appropriately energizing the electrode layers at a desired time instantly switches the state of the polarizing angle from a first orientation angle of 0° to a second orientation angle of 90°.

When a single electronically enabled polarizer 415 is included in the image-capture device 400, the emitter 412 and the emitter 414 may be coupled to optimize total light output. In such an arrangement, the illumination power may be controlled by adjusting a bias current that is coupled to the individual light emitting elements (e.g., light-emitting diodes) forming a composite emitter 416. When the polarizer 415 is enabled the bias current is controllably adjusted between exposures to compensate for the varying light loss associated with co- and cross-polarized exposures.

As described, when a polarizer is configured to transmit light waves running in parallel to those allowed to pass through a second polarizer covering a lens, the first polarizer placed between an illumination source and a subject-of-interest, a relatively lower illumination power may be required to illuminate the subject-of-interest during one of the paired or related image exposures. When a polarizer 415 is either permanently introduced in the case of a film or temporarily enabled when an electronically controlled polarizer is placed between an illumination source 410 and a subject-of-interest, a relatively larger illumination power is provided to illuminate the subject-of-interest (e.g., a surface or surfaces) during the remaining one of the paired image exposures. The elapsed time between a first exposure and a subsequent exposure is controlled by the processor 450 by synchronizing the aperture 434, shutter 440 and the illumination controller 420.

Accordingly, polarized light 413 in a first orientation or polarized light 417 in a second orientation is directed away from the image-capture device 400 toward a subject-of-interest 310 in a real-world scene 300. Reflected light 419 from the subject-of-interest 310 is received by the optical subsystem 430. The optical subsystem 430 and shutter 440 are controllably enabled in a coordinated manner with the control signal or signals communicated to the illumination controller 420 to open the aperture 434 and shutter 440 to capture image 462b.

When a polarizing filter is located between the subject-of-interest and an image sensor, the angle of polarization relative to a given light source and reflected off subject matter with a given reflectance property, may reduce the amount of light passed through to the image sensor anywhere between 1.5 f-stops for co-polarized exposures to upwards of 4 f-stops for cross-polarized exposures. Auto-exposure cameras will adjust for the loss of available light by widening the aperture, lengthening the time the shutter is open, and/or increasing the sensitivity of the image sensor. However, metering and auto-focus sensors in certain cameras, including virtually all auto-focus SLRs, will not work properly with linear polarizers because the beamsplitters used to split off the light for focusing and metering are polarization dependent. In addition, linearly-polarized light may also defeat the action of the anti-aliasing filter (i.e., a low-pass filter) on the imaging sensor. Accordingly, auto-focus SLRs will often use a circular polarizer. A circular polarizer consists of a linear polarizer on the front, with a quarter-wave plate on the back. The quarter-wave plate converts the selected polarization to circularly polarized light inside the image-capture system. These circular polarizers work with all types of cameras, because mirrors and beamsplitters split circularly polarized light the same way they split non-polarized light.

A linear polarizing filter can be easily distinguished from a circular polarizing filter. In linear polarizing filters, the polarizing effect works regardless of which side of the filter the scene is viewed from. In contrast, with "circular" polarizing filters, the polarizing effect works when the scene is viewed from one side of the filter, but does not work when looking through the opposed side of the filter. It is noted that linear polarizers deliver a truer specular reflectance model than do circular polarizers.

The principles involved with capturing two images in quick succession with different states of polarization defined by the relative rotation of separate polarizing filters with a first polarizing filter 415a, 415b proximal to the illumination source and a second polarizing filter 432 between the subject of interest and an image sensor 445 and with different illumination power levels can be applied to any light source/fixture and many photographic system architectures. Independent of the type of light source deployed in an emitter 416, the image-capture device 400 optimizes light output where light is needed to reduce or eliminate shadows and to provide sufficient reflected light 419 across the entire two-dimensional array of photosensitive electronic elements in the image sensor 445. For example, light rays cast substantially proximal to and on-axis with respect to the longitudinal axis 470 of the lens 430, limited only by the ability to place light generating fixtures as close to the outer edge of a lens assembly as imposed by the physical tolerances of manufacturing, can be used to reduce and in some situations all but eliminate shadows. To achieve nearly uniform illumination across the surface-of-interest the light directed away from the image-capture device 400 by the emitter 412, the emitter 414, or a combination emitter 416 and/or the individual elements comprising the described emitters may be collimated. In addition to collimating the light, the individual elements comprising the emitters 412, 414, 416 may be selected for their ability to produce a uniform output over a desired range of frequencies in response to a desired input.

In terms of the volume of light output by the emitter 412 and the emitter 414, light output is paramount to compensate for light loss due to the polarizer(s) 415, 432 as photogrammetry is dependent on low-noise, adequately exposed and focused surface textures. Each of these objectives are compromised by conventional solutions with 1) slower shutter speeds, which introduce the problem of inadequate temporal resolution, 2) wider apertures, which predict shallower depth of field, which in effect compromises the need for in-focus pixels, and 3) higher imager sensitivity, which causes "noise" or larger grain in the images, which both frustrates the photogrammetry engine's abilities to identify common points of interest between overlapping photos, as well as compromises the quality of the texture maps used to skin the geometry returned from the photogrammetry.

Accordingly, in support of optimizing light output, attention may be directed to minimizing the space between light emitting elements in the emitter 412, the emitter 414 or the composite emitter 416 and the outer surface of the lens assembly 433, thereby fitting a greater number of light emitting elements into that space.

Light that is directed from the image-capture device 400 toward a subject or surface to be captured in an image or exposure (both cross-polarized light 413 and co-polarized light 417) preferably includes a range of visible wavelengths. The illustrated embodiment shows co-polarized or polarized light 417 being emitted or directed away from the image-capture device 400 relatively further away from the optical subsystem 430 than the non-polarized light 413 that emanates from the image-capture device 400. However, the image-capture system 400 is not so limited. In some embodiments, both the emitter 412 and the emitter 414 include respective sets of light-emitting diodes or flashtubes that are arranged about the perimeter of the optical subsystem 430. In these embodiments, the individual elements forming the separately controlled emitters 412, 414 may be alternated element by element, row by row, or arranged in other periodic arrangements about the optical subsystem 430 and more specifically the outer surface of a lens housing (not shown).

In addition to being separately energized by the illumination controller 420, the individual elements of the emitter 412 and the emitter 414 may also be separately energized to finely adjust the luminous flux that is projected from the image-capture device 400 to illuminate the subject-of-interest.

As further indicated in FIG. 4A, the image sensor 445 may comprise an array of elements sensitive to visible light, non-visible light (one or both of ultraviolet and infrared light), multi-spectral light and or hyper-spectral light. Although conventional image sensors may include elements sensitive to one or the other of visible light and non-visible light, the described imaging techniques can be used with image sensors that may combine various ranges of electromagnetic radiation sensitivity. For example, these imaging techniques can be applied to an image sensor that combines infrared sensitive elements with visible light sensitive elements. In other example embodiments, the image sensor 445 may be responsive to multi-spectral light outside of the range of visible light. When the image sensor 445 is sensitive to a combination of various ranges of electromagnetic radiation, the separate elements forming the emitter 412, the emitter 414, or a composite emitter 416 may be arranged with elements capable of producing one or more of non-visible light, multi-spectral light and or hyper-spectral light.

However arranged with respect to the range or ranges of sensitivity to electromagnetic radiation, the image sensor 445 of the image-capture device 400 will benefit from one or more stabilization systems. For example, the Sony Corporation has developed a full-frame camera with 5-axis image stabilization. When energized, the stabilization system uses suitably positioned magnets and actuators to controllably float the image sensor within the camera body. When a subject-of-interest is in focus and the lens assembly communicates the focal length to the stabilization system controller, pitch (rotation about the x-axis), yaw (rotation about the Y-axis, relative shift along the X-axis or Y-axis and rotation about the longitudinal axis of the lens assembly in the X-Y plane can be countered to produce an exposure with substantially reduced image blur even in low-light conditions, while at the same time protecting against a change in camera orientation between exposures of image pairs, thus ensuring nearly identical rasters as required for isolating specular data using the difference blend between each layered image pair. Such image sensor stabilization techniques provide greater latitude to an operator when selecting an aperture setting.

The first image 462a and the second image 462b can be temporarily stored in the image-capture device 400 such as in memory 460 for later transfer to an image-processing system. Such a transfer need not be direct as image files can be stored on a data-storage medium, on network-coupled storage devices, or on both for later transfer to an image-processing system. In addition, such image information transfers can occur in alternative sequence and even substantially together or overlapping in time. Furthermore, corresponding portions of each of the images may be processed before the entirety of a raster 463 or array of pixels comprising an entire image is received by the image-processing system. Corresponding portions of each of the images are defined both by relative location in an array of pixels and the corresponding data values associated with the sensor at those pixel element locations. For example, if the image sensor is a sensor that is responsive to portions of the electromagnetic spectrum perceived by the average human to correspond to the color red, green and blue, a red data value from a first pixel location defined by a row and a column position with respect to an origin of the raster of pixel elements in the image sensor is mathematically combined (e.g., through subtraction) with a corresponding data value from the same relative pixel location from the remaining image. Similarly, a green data value and a blue data value from the first pixel location, respectively, are mathematically combined with corresponding data values from the same relative pixel location from the remaining image.

When a binned image sensor is used to capture the image information, two or more adjacent pixels of a similar sensitivity range are sampled together to produce a data value. For example, an integer number of "red" wavelength photosensitive elements are sampled together to produce a single data value representative of these wavelengths present in an area of the image sensor. This same sampling technique can be applied to "green" wavelength photosensitive elements, "blue" wavelength photosensitive elements as well as other frequency ranges of the electromagnetic spectrum and the opacity channel as may be desired.

Image data can be arranged in any order using any desired number of bits to represent data values corresponding to the electrical signal produced at a corresponding location in the image sensor at a defined location in the raster of pixels. In computer graphics, pixels encoding the RGBA color space information, where the channel defined by the letter A corresponds to opacity, are stored in computer memory or in files on disk, in well-defined formats. In a common format the intensity of each channel sampled by the image sensor is defined by 8 bits, and are arranged in memory in such a manner that a single 32-bit unsigned integer has the alpha or "A" sample in the highest 8 bits, followed by the red sample, green sample and the blue sample in the lowest 8 bits. This is often called "ARGB." Other standards including different numbers of bits in other sequences are known and used in storing RGB and A channel information. Still other data storage arrangements will be used in conjunction with reflected light captured by a multi-spectral image sensor and a hyper-spectral image sensor.

As further indicated in FIG. 4A, a telemetry store 465 may include device info including image capture device parameters, as well as device orientation and location information in a three-dimensional volume. The telemetry store 465 will include such data for each instance of an image 462a through 462n. Information in the telemetry store 465 will be transferred with the images 462 to an image processing system (not shown).

Figure 4B:
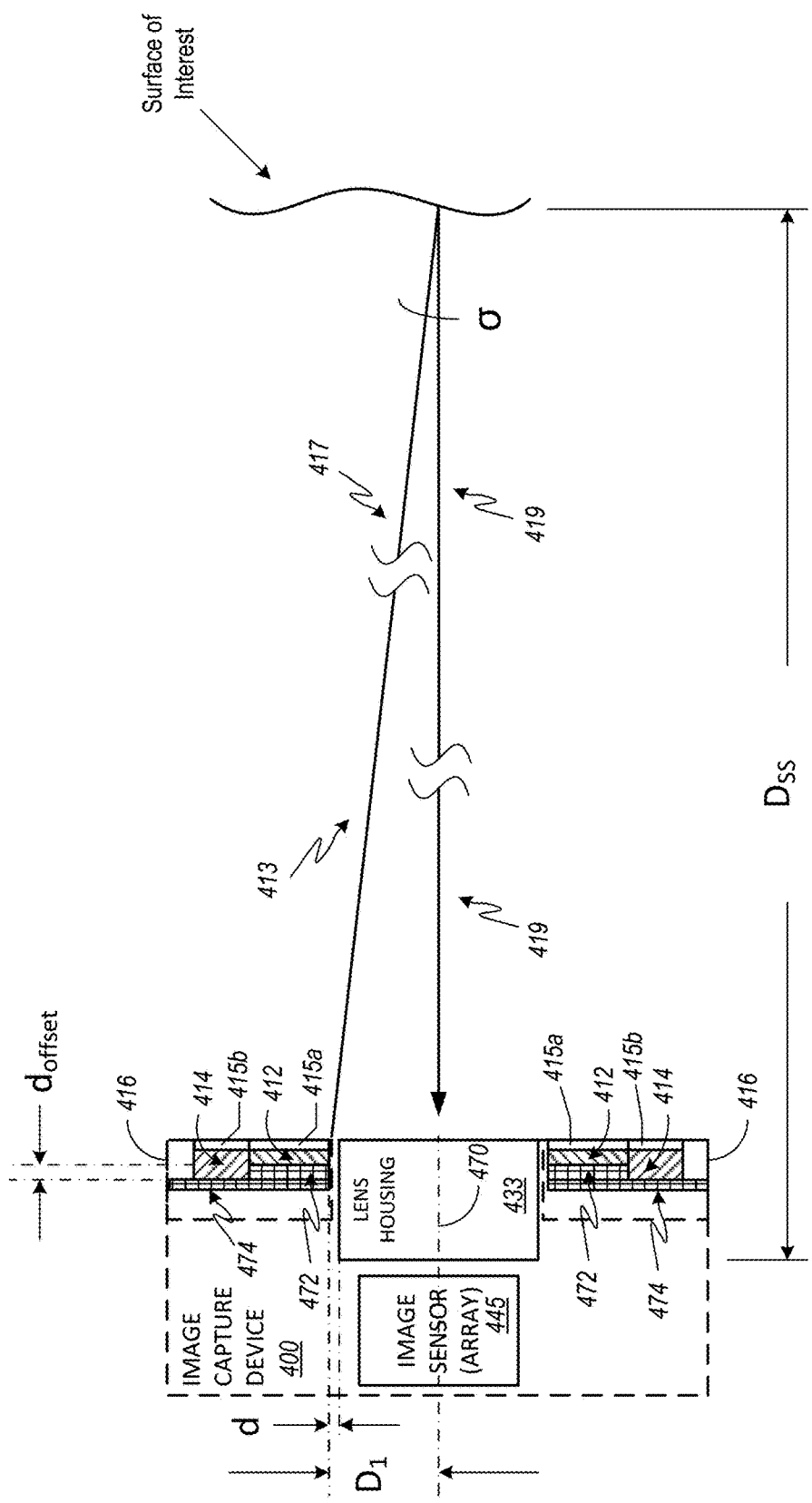
FIG. 4B is a schematic diagram illustrating how an embodiment of the image-capture device of FIG. 4A reduces the likelihood of shadows in images.

The schematic diagram in FIG. 4B includes an arrangement of the image-capture device 400 including a composite emitter 416 that surrounds the lens assembly 433 such that the likelihood of shadows is substantially reduced, or for some surfaces and separation distances between the image-capture device 400 and the subject-of-interest, shadows are entirely avoided. As shown, the image sensor 445 and lens assembly 433 are arranged about a longitudinal axis or centerline 447. The longitudinal axis 447 extends in the direction of a normal vector from the photosensitive elements in the image sensor 445 and through the center of lens assembly 433. In the illustrated arrangement, the emitter 416 is shown in a partial section (as if the separately controlled emitter 412 and emitter 414 were cut along a plane that passes through centerline or longitudinal 447). When the lens assembly 433 is shaped like a cylinder, the set of light-emitting diodes or flashtubes forming the emitter 412 and/or the emitter 414 can be arranged in an arc, semicircle or an annular ring so that the light emitting elements can be arranged adjacent to or nearly against the outer surface of the lens assembly 433.

Although the polarizer 415a and the polarizer 415b are adjacent to the emitter 412 and the emitter 414 in the illustrated arrangement to ensure a first orientation of emitted light and a second orientation of emitted light are substantially orthogonal to one another, the image capture device 400 is not necessarily so limited. For example, in an alternative embodiment (not shown) the separate light emitting elements that form the emitter 412 and the emitter 414 are arranged with a collimating dome, lens or other structure arranged to emit light in a desired polarization or orientation. A first orientation or plane corresponding to the emitter 412 is orthogonal to a second orientation or plane corresponding to the emitter 414. As shown in the embodiments illustrated in FIG. 4A and FIG. 4C, a circular polarizer 432 may be arranged in or on the lens housing 433 to capture corresponding images of the same subject-of-interest with co-polarized reflected light and cross-polarized reflected light.

When the emitter 416 is arranged in the shape of a ring (or rings) that surrounds the lens assembly 433, a distance, d, defines the space between the outer surface of the lens assembly 433 and the inner diameter of the emitter 416. A separate distance $D_1$ is the distance from the center of the image sensor 445 (or lens assembly 433) to the inner diameter of the emitter 416. A third distance $D_{SS}$ is the distance between the surface of the image sensor 445 and the surface-of-interest along the camera orientation or the longitudinal axis 447 of the lens housing 433. A fourth distance $d_{offset}$ is the distance between the forward most surface of a substrate 472 or circuit board that supports and distributes the necessary signals to controllably energize individual light-emitting diodes or flashtubes of the emitter 412 and a respective substrate 474 or circuit board associated with emitter 414. This fourth distance is selected in accordance with the physical dimension of the corresponding elements forming the emitter 412 and the emitter 414 in the direction of the longitudinal axis 447 of the lens housing 433 so that a forward most or emitting surface of the respective devices is aligned or is very close to being aligned with the forward most surface of the lens housing 433 so as to reduce the possibility of or even avoid entirely casting a shadow on the surface of interest.

As indicated by a single arrow, polarized light 413 or polarized light 417 is directed away from the emitter 416 of the image-capture device 400 toward the surface-of-interest or subject-of-interest where the reflected light 419 is redirected by an angle, σ, along a vector that is substantially on-axis with the centerline or longitudinal axis 447 of the lens housing 433. In an example embodiment, where the lens assembly 433 has an outer diameter of approximately 87 mm, the distance d is about 1 mm and the image-capture device 400 is about 1 m from the surface-of-interest, the angle σ is approximately 2.5°. The distance between the longitudinal axis 447 and the inner diameter of the emitter 416 can be used in Equation 1 to solve for the angle θ.

$$\sigma^o = \tan^{-1} \frac{D_1}{D_{SS}} \qquad \text{Equation 1}$$

When the angle σ is less than about 10° for separation distances of about 1 m or greater, shadows are substantially and significantly reduced in images that include most surfaces-of-interest. When the angle σ is less than about 5° for separation distances of about 1 m or greater, shadows are more significantly reduced in images that include even more surfaces-of-interest in real-world environments. When the angle σ is less than or about 2.5° for separation distances of about 1 m or greater, shadows are avoided in images for nearly all surfaces in a real-world scene. Consequently, images or surface textures including subject matter illuminated in such a manner, that is when the angle σ is less than about 10° for separation distances of about 1 m or greater are substantially shadow free. Thus, the illumination source 410 of the image-capture device 400 illuminates one or more surfaces in a location such that reflected light from the one or more surfaces is substantially shadow free.

Figure 4C:
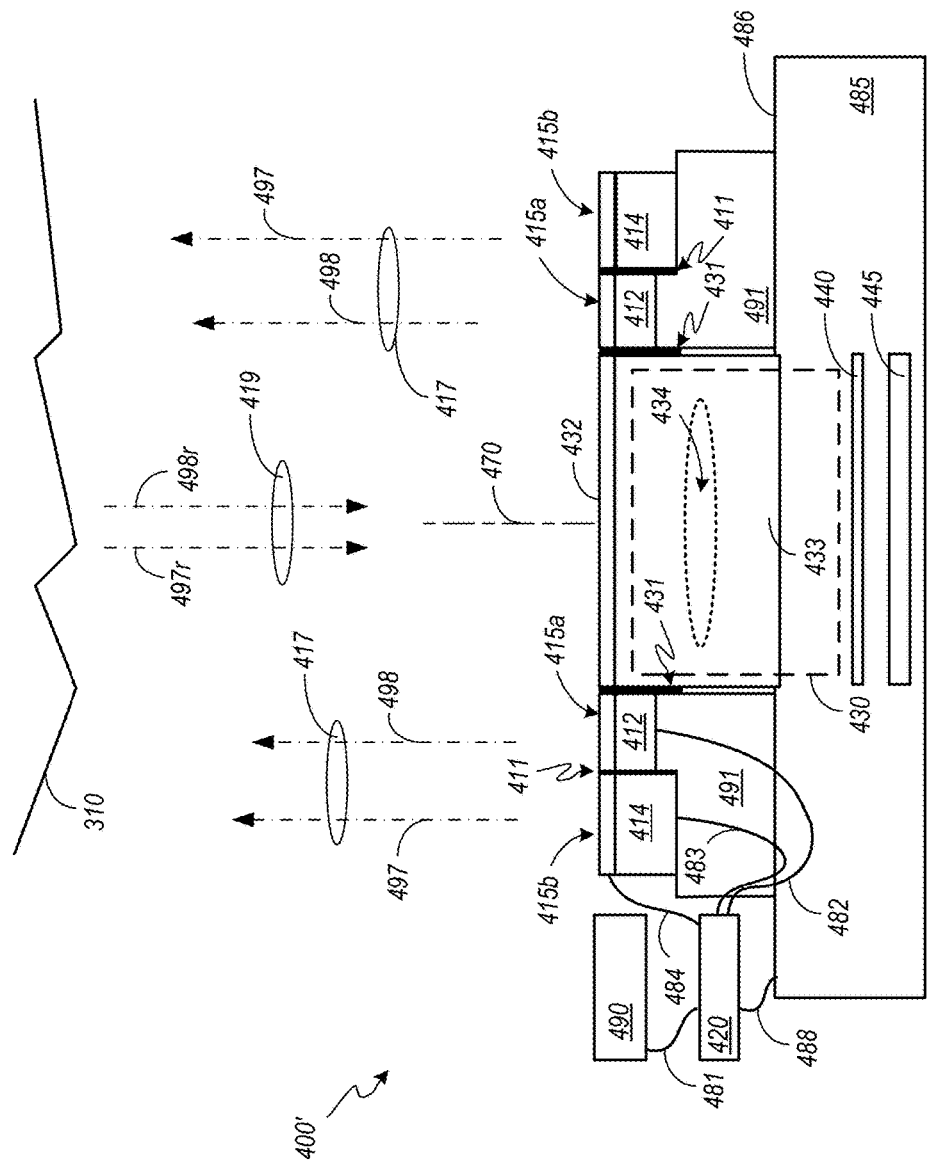
FIG. 4C is a schematic diagram of an alternative embodiment of the image-capture device of FIG. 3.

FIG. 4C is a schematic diagram of an alternative embodiment of the image-capture device of FIG. 3. A substrate or mount 491 is arranged about the lens housing 433 on a surface 486 of the camera enclosure 485. The mount 491 is arranged to ensure that the emitting surface or forward most facing surface of the polarizer 415 is closely aligned with the forward most facing surface of the polarizer 432 arranged on the lens housing 433.

In the illustrated arrangement, the illumination controller 420 and a corresponding power source 490 are outside of a camera enclosure 485. As illustrated, the power source 490 is coupled to the illumination controller via conductors arranged in a flexible connection 481. The power supply 490 may be arranged with one or more circuits (not shown) configured to monitor one or more conditions of storage cells in the power supply 490. Similarly, the illumination controller 420 may be arranged with one or more circuits (not shown) for monitoring operating conditions of the drive and or bias current generating circuits in the illumination controller 420.

The illumination controller 420 operates in response to a synchronization signal generated within the camera enclosure 485 and provided on connection 488. In turn, the illumination controller 420 generates various signals communicated along connection 482 to the emitter 412 and along connection 483 to the emitter 414 such as a biasing current that controllably enables and varies the illumination output from the emitter 412 and the emitter 414 at desired times. In addition, the illumination controller 420 generates various signals communicated along connection 484 to one or both of the polarizer 415a and/or the polarizer 415b to controllably adjust the orientation angle of light permitted to pass through the respective polarizer 415a, 415b.

The camera enclosure 485 supports an optical subsystem 430, a shutter 440 and an image sensor 445 as well as a corresponding processor 450, memory 460 and an optional scanner subsystem 425. As described in association with the embodiment illustrated in FIG. 4A, these elements enable the image capture device 400' to capture and temporarily store a number of desired images of a subject-of-interest 310 and the image-capture device is controllably positioned in a real-world scene 300.

As further indicated in FIG. 4C polarized light 417 is generated by the emitter 412 and/or emitter 414 where the generated light is filtered by a corresponding polarizer 415a, 415b to generate polarized light 417 having either a first orientation 457 or a second orientation 458. The polarized light 417 is collimated such that the polarized light 417 is aligned and directed away from the image-capture device 400' in a direction that is substantially parallel to a longitudinal axis 470 of the optical subsystem 470. An opaque barrier 411 interposed between the polarizer 415a and the polarizer 415b as well as the emitter 412 and the emitter 414 prevents light generated by emitter 412 from passing through the polarizer 415b and further prevents light generated by the emitter 414 from passing through the polarizer 415a. After encountering the various surfaces of a subject-of-interest 310 the incident polarized light 417 becomes reflected light 419 having either a first orientation 457r or a second orientation 458r. When the polarizer 432 is substantially aligned with one of the first orientation 457r or the second orientation 458r the image capture device 400' captures and temporarily stores images that were the result of co-polarized light and cross-polarized light of substantially the same subject-of-interest 310 in a real world scene 300. As further illustrated in FIG. 4C, a barrier 431 prevents light passing through the polarizer 415a or light passing through the emitter 415b from entering the optical subsystem 430 without first reflecting from a surface or surfaces of the subject-of-interest 310.

Figure 4D:
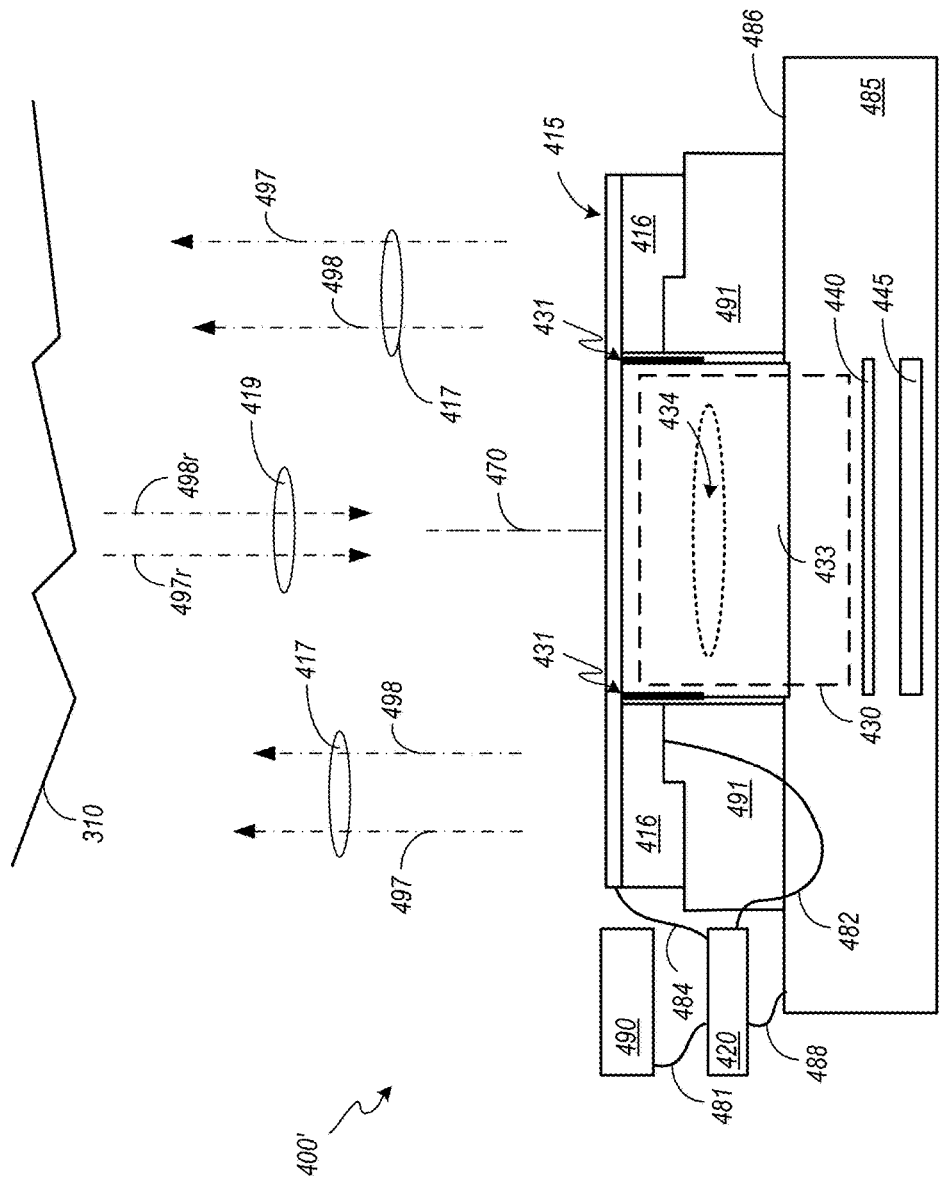
FIG. 4D is a schematic diagram of another alternative embodiment of the image-capture device of FIG. 3.

FIG. 4D illustrates another alternative embodiment of the image-capture device of FIG. 3. Here, an emitter 416 is arranged on the mount 491 and under a single polarizer 415. An opaque barrier 431 prevents light generated by the emitter 416 from entering the optical subsystem 430 without being reflected from a surface or surfaces of the subject-of-interest 310.

FIG. 5 is a schematic diagram of an alternative embodiment of the image-capture device of FIG. 3. As illustrated, the image-capture device 500 is an assembly of subsystems including an illumination source 512, illumination controller 520, optical subsystem 530, processor 450 and memory 460. A device enclosure 531 supports a lens housing 533 and protects the processor 450 memory 460 and internal components of optical subsystem 530. As shown by broken imaginary lines A-A, the illumination source 512 is arranged as an annularly shaped ring of light-emitting semiconductors 532 that closely abuts the outermost surface of the lens housing 533. A polarizer 515 is similarly shaped and arranged in registration above the illumination source 512. The light emitting semiconductors 532 may be arranged with a collimating dome or lens that aligns the emitted light so that light generated by the light-emitting devices is transmitted in a direction that is substantially parallel to a longitudinal axis of the lens assembly 533. The polarizer 515, which may be a layer of polarizing film, filters the collimated light so that light that passes beyond the polarizer 515 oscillates in a first orientation about a ray in a direction substantially parallel to a longitudinal axis of the lens housing 533.

The processor 450 is arranged to manage and coordinate the operation of the various mechanical and electro-mechanical subsystems in the image-capture device 500. A circuit or circuits provided in the illumination controller 520 and/or in conjunction with an assembly of rechargeable cells or battery pack may be used to monitor one or more parameters of the rechargeable cells (not shown) used to controllably energize light-emitting semiconductors 532 arranged about the illumination source 512. The processor 450 may operate autonomously, in response to one or more inputs received from an operator and or in conjunction with information received from an optional scanner subsystem 425 (not shown). The scanner subsystem 425 may include a remote sensing technology such as LiDAR which measures distance by illuminating a target with a laser and analyzing the reflected light. Such distance information can be applied by the processor 450 to set one or more operational parameters such as a focus adjustment, aperture, image sensor sensitivity, shutter speed. In addition, such distance information can be useful in guiding the position of the image-capture device 500 as it traverses the real-world scene 300. The processor 450 generates a synchronization signal which is communicated along connection 540 to the illumination controller 520. The illumination controller 520 includes one or more bias current generation circuits, the outputs of which are communicated along connection 541 to controllably energize the illumination source 512.

The collimated and polarized light directed away from the enclosure 531 returns in the form of reflected light 419 that is focused by lens 511 in the direction of a beamsplitter 522. The beamsplitter 522 permits a portion of the incident reflected light 419 to pass through to a first optical path 521 that intersects a polarizer 524 and an image sensor 525. A second portion of the incident reflected light 419 is reflected by a surface of the beamsplitter 522 to a second optical path 527 that intersects a polarizer 528 and image sensor 529. A single shutter (not shown) may be provided in a transverse orientation to the reflected light 419 prior to the beamsplitter 522. Alternatively, separate shutters (not shown) may be arranged after the polarizers 524, 528 in the respective optical paths. The processor 450 controls the various electromechanical elements to coordinate the capture and temporary storage in the memory 460 of image pairs 462a through 462n of a subject-of-interest in a real world scene. When one of the polarizer 524 and the polarizer 528 is in the same orientation as the polarizer 515 and the remaining one of the polarizer 524 and the polarizer 528 is arranged orthogonally with respect to the first orientation, one of the images in an image pair is responsive to co-polarized light while the other image in the image pair is responsive to cross-polarized light.

As further indicated by way of dashed lines the memory 460 may be arranged to store various information in image store 550 to enable a post capture image processing of the image pairs 462a through 462n as may be desired. In this regard, the image store 550 may include device information 555 such as the various adjustable parameters that were set when a particular image pair instance was captured. In addition, the image store 550 may include location and orientation information that identifies both the position and rotation of the image capture device 500 in the real world scene. This information may be recorded in conjunction with time information 567 with respect to an identified origin in a three-dimensional image space to serve as a reference for sequencing and or stitching the image information in a model of a real world scene.

Figure 6:
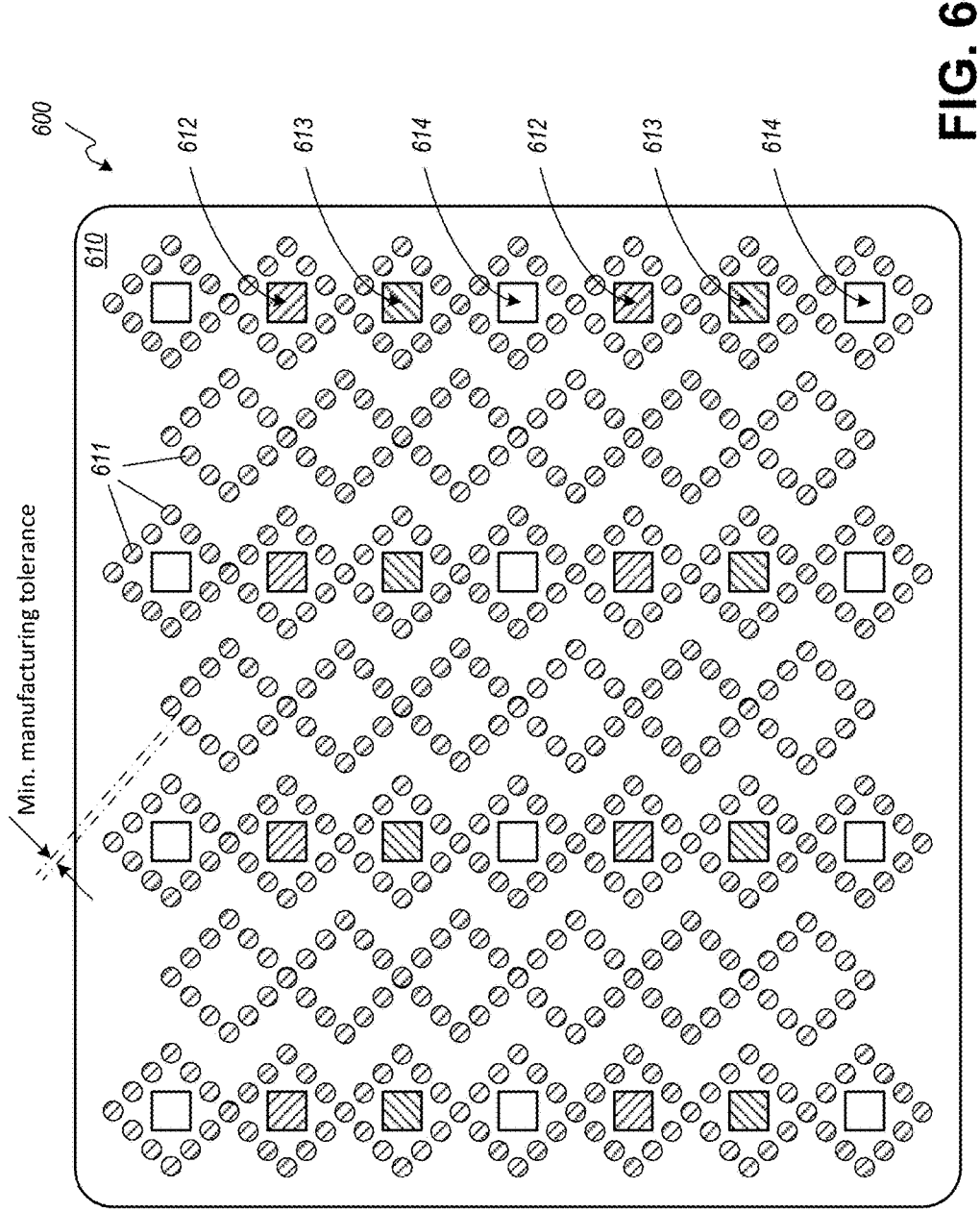
FIG. 6 is a schematic diagram of another example embodiment of the image-capture device of FIG. 3.

FIG. 6 is a schematic diagram of another example embodiment of the image-capture device of FIG. 3. The image-capture device 600 is arranged as a planar array of devices distributed across a mounting surface 610 of a substrate or circuit board supported by a enclosure or other structural elements (not shown) as may be desired. Electrically controlled devices distributed across the mounting surface 610 include emitters 611 and a host of image sensors 612, image sensors 613, and image sensors 614.

As indicated in the illustrated embodiment, the emitters 611 may be aligned in arrangement with a polarizing film or other light polarizing element to filter light oscillating in all but a desired orientation that is directed in a direction substantially orthogonal to the plane of the mounting surface 611. The image sensors 612 are arranged with a polarizing filter that is substantially aligned with the desired orientation of the light generated by and directed away from the image-capture device 600 by the emitters 611. The image sensors 613 are arranged with a polarizing filter that is substantially orthogonal to or shifted by 90° from the desired orientation of the light directed away from the image-capture device 600 by the emitters 611 and orthogonal to the polarizing filter associated with each of the image sensors 612. The image sensors 614 are arranged without a polarizing filter and are available to capture reflected light oscillating in any and all orientations. Consequently, as more image sensors 614 are energized, a signal to noise ratio in the image information provided by the image sensors 612, image sensors 613 and image sensors 614 can be expected to increase.

Light that is generated within the separate emitters 611 is polarized and directed away from the mounting surface 610 and returns to the distributed image sensors 612, image sensors 613 and image sensors 614 after having been reflected by a subject or subjects of interest within the field of view of the image-capture device 600. The arrangement of the polarizing films or other structures in registration with the image sensors 612 and the image sensors 613 where the respective orientations of light that passes through the polarizer is orthogonal enables the image-capture device 600 to generate images responsive to co-polarized light and cross-polarized light, respectively, with reflected light from the same subject matter.

As further illustrated in FIG. 6, a separation distance between adjacent emitters 611 arranged along the mounting surface 610 is dependent upon a minimum manufacturing tolerance when the mounting surface 610 is a surface of a printed circuit board and the emitters 611 are formed from semiconductor devices. Although each emitter 611 is depicted as a circular shaped singular element generally arranged in a set of closely positioned emitters 611 in a diamond-like shape across the mounting surface 610, it should be understood that other arrangements are both possible and contemplated. For example, depending on the relative sizes of the areas of the separate image sensors 612, 613, 614 and the areas of the individual semiconductor(s), a square shaped arrangement of emitters 611 in alignment with the edges of one or more of the image sensors 612, 613, 614 are possible and may permit more emitting devices to be placed adjacent to a respective perimeter of one or more select image sensor 612, 613, 614. While the illustrated embodiment includes related emitters 611 that do not surround image sensors interspersed between columns of image sensors of alternating image sensors 612, 613, 614, it should be understood that a host of alternative arrangements may be deployed to achieve any number of efficiencies in density of select semiconductor devices across the mounting surface 610 or to achieve other desired effects in the image information. Although the illustrated arrangement shows a single emitter 611 arranged as a circle, it should be understood that light may be generated by sets of semiconductor devices that were produced on a single die. Such dies may be singulated, sawed or cut in any number of various arrangements with a desired number of light-emitting semiconductor devices arranged thereon.

It should be noted that the term "comprising" does not exclude other elements or features and the terms "a" or "an" do not exclude a plurality. Also elements described in association with different embodiments may be combined.

One or more illustrative or exemplary embodiments of the invention have been described above. However, it is to be understood that the improved image-capture devices are defined by the appended claims and are not limited to the specific embodiments described.

| List of Reference Symbols in the Drawings | |
|---|---|
| 10 | electromagnetic spectrum |
| 11, 12 | abscissa |
| 13 | visible light |
| 20, 300 | real-world scene |
| 21 | polygonal mesh |
| 30 | coordinate system |
| 31 | origin |
| 32 | x-axis |
| 33 | z-axis |
| 34 | y-axis |
| 100, 400, 500 | image-capture device |
| 102 | enclosure |
| 310 | subject-of-interest |
| 320 | frustum |
| 330 | vehicle |
| 340, 340', 340" | pole |
| 342 | section |
| 345 | adjustment sleeve |
| 350 | elongate flexible member |
| 352 | end |
| 354 | end |
| 360 | carriage support |
| 410 | illumination source |
| 411 | barrier |
| 412, 414, 416 | emitter |
| 413 | polarized light |
| 415 | polarizer |
| 417 | polarized light |
| 419 | reflected light |
| 420, 520 | illumination controller |
| 425 | scanner subsystem |
| 430, 530 | optical subsystem |
| 431 | barrier |

| List of Reference Symbols in the Drawings | |
|---|---|
| 432 | polarizer |
| 433, 533 | lens housing |
| 434 | aperture |
| 440 | shutter |
| 441 | co-polarized light |
| 442 | cross-polarized light |
| 445 | sensor |
| 450 | processor |
| 460 | memory |
| 462 | image instance |
| 463 | raster |
| 465 | telemetry store |
| d | distance |
| $d_{offset}$ | offset |
| $D_1$ | distance |
| $D_{ss}$ | distance |
| σ | angle of incidence |
| 470 | longitudinal axis |
| 472 | substrate |
| 474 | substrate |
| 481 | connection |
| 482 | connection |
| 483 | connection |
| 484 | connection |
| 485 | enclosure |
| 486 | mounting surface |
| 488 | connection |
| 490 | power supply |
| 491 | mount |
| 497 | polarized light (1$^{st}$ orientation) |
| 497r | reflected light |
| 498 | polarized light (2$^{nd}$ orientation) |
| 498r | reflected light |
| 510 | device enclosure |
| 511 | lens |
| 512 | illumination source |
| 515 | polarizer |
| 521 | optical path |
| 522 | beamsplitter |
| 523 | light |
| 524 | polarizer |
| 525 | image sensor |
| 527 | twice reflected light |
| 528 | polarizer |
| 529 | image sensor |
| 531 | mounting surface |
| 532 | semiconductors |
| 540 | connection |
| 550 | image store |
| 555 | device information |
| 556 | raster |
| 567 | time |
| 600 | device enclosure |
| 610 | mounting surface |
| 611 | emitters |
| 612 | image sensors |
| 613 | image sensors |
| 614 | image sensors |
| 700 | light |
| 702 | two-headed arrow |
| 704 | two-headed arrow |
| 705 | intersection |
| 710 | polarizing film |
| 715 | polarizing film |
| 720 | polarized light |
| 722 | unit circle |
| 725 | polarized light |
| 727 | unit circle |

I claim:

1. An image-capture device, comprising:
an enclosure;
a lens arranged in a lens housing supported by the enclosure;
an illumination source having separately energized light emitters surrounding a perimeter of the lens housing, wherein when a first light emitter is energized the image-capture device directs light oscillating in a first orientation away from the image-capture device and wherein when a second light emitter is energized, the image-capture device directs light oscillating in a second orientation different from the first orientation away from the image-capture device, wherein one of the first light emitter and the second light emitter are formed from a ring of elements concentrically arranged about the lens housing, wherein one of the first light emitter and the second light emitter include elements arranged in more than one ring surrounding the lens, wherein a first substrate upon which elements in a first ring are arranged is offset from a second substrate upon which elements in a concentric ring arranged about the first ring are located, wherein a depth of the offset keeps a respective emitting surface of the respective elements distributed across the first ring and the concentric ring substantially coplanar; and an image sensor supported by the enclosure and arranged to convert reflected light responsive to the respective first and second orientations into respective data assets.

2. The device of claim 1, wherein the first orientation is approximately orthogonal to the second orientation.

3. The device of claim 1, wherein light oscillating in the first orientation is responsive to a respective feature of the first light emitter.

4. The device of claim 1, wherein light oscillating in the second orientation is responsive to a respective feature of the second light emitter.

5. The device of claim 1, wherein light oscillating in the first orientation is responsive to a first polarizer located between the first light emitter and a subject-of-interest.

6. The device of claim 1, wherein light oscillating in the second orientation is responsive to a second polarizer located between the second light emitter and a subject-of-interest.

7. The device of claim 1, wherein an illumination power produced by at least one of the first light emitter and the second light emitter is controllably adjusted by modifying a bias current.

8. The device of claim 1, wherein the first light emitter and the second light emitter are arranged circumferentially about the lens housing.

9. The device of claim 1, wherein the illumination source directs light oscillating in two orientations substantially orthogonal to one another away from the device, the light forming an angle of incidence with respect to a longitudinal axis of the lens assembly of less than about 2.5 degrees when reflected by a subject-of-interest separated by at least one meter from the image-capture device.

10. The device of claim 1, wherein at least one of the first light emitter and the second light emitter comprise semiconductors.

11. The device of claim 10, wherein a distance along a plane substantially orthogonal to a longitudinal axis of the lens assembly between nearest neighbors of the semiconductors is determined by a minimum tolerance associated with a semiconductor manufacturing process.

12. The device of claim 1, wherein one of the first light emitter and the second light emitter emit light with a range of different wavelengths from 390 nm to 700 nm.

13. The device of claim 1, wherein one of the first light emitter and the second light emitter emit light with a range of different wavelengths with wavelengths shorter than 390 nm and/or longer than 700 nm.

14. The device of claim 1, wherein the first light emitter and the second light emitter are arranged to prevent emitted light from entering the lens without contacting a surface of a subject-of-interest and are further arranged with a barrier interposed between the first light emitter and the second light emitter to prevent emitted light from a first emitter from passing through a polarizer filter associated with a second light emitter and respectively from a second emitter from passing through a polarizer filter associated with a first light emitter.

15. The device of claim 1, further comprising:
a controller in communication with the image sensor and the image-capture device, the controller arranged to coordinate operation of the image-capture device and the illumination source such that an interval between a first exposure of the image sensor to light oscillating in the first orientation away from the image-capture device and reflected by a subject-of-interest and a second exposure of the sensor to light oscillating in the second orientation away from the image-capture device and reflected by the subject-of-interest is controlled.

16. The device of claim 15, wherein the image sensor is nonplanar.

17. The device of claim 15, wherein the image sensor includes hyperspectral sensitive semiconductors.

18. The device of claim 15, wherein the interval between the first exposure and the second exposure results in a first raster of image information and a second raster of image information responsive to substantially the same image information.

19. The device of claim 18, wherein the image information in the first raster and the image information in the second raster are responsive to substantially the same orientation of the image-capture device.

20. The device of claim 15, further comprising:
a polarizer positioned between the image sensor and a subject of interest, the polarizer configured substantially orthogonal to light oscillating in one of the first orientation or the second orientation and substantially parallel to light oscillating in the remaining one of the first orientation or the second orientation.

21. The device of claim 15, wherein the controller generates a signal that modifies one of the first orientation or the second orientation.

22. An image-capture device, comprising:
an enclosure including at least two image sensors;
a lens in a lens housing supported by the enclosure; and
an illumination source that directs emitted light away from the enclosure, the illumination source arranged such that respective emitters surround a perimeter of the lens housing,
wherein emitted light directed away from the enclosure by the illumination source is orthogonally polarized with respect to a polarization angle of reflected light that intersects at least one image sensor,
wherein the lens receives reflected light from a subject-of-interest and directs the reflected light in a first optical path having a first polarizer and in a second optical path having a second polarizer such that reflected light that traverses the first polarizer is substantially orthogonal to reflected light that traverses the second polarizer,
wherein a first image sensor intersecting the first optical path captures a first image and a second image sensor intersecting the second optical path captures a second image such that the first image and the second image are captured at a first time.

23. The device of claim 22, wherein at least one image sensor intersects the first optical path and at least one separate image sensor intersects the second optical path.

24. The device of claim 22, further comprising:
a beamsplitter, wherein the first optical path receives transmitted light that traverses the beamsplitter and the second optical path receives light reflected by the beamsplitter.

25. The device of claim 22, wherein the illumination source and lens are arranged to prevent emitted light from entering the lens without contacting a surface of the subject-of-interest.

26. The device of claim 22, wherein the illumination source comprises semiconductors arranged about the lens housing.

27. An image-capture device, comprising:
an enclosure having a mounting surface;
light emitters supported along the mounting surface, the light emitters directing light in a direction substantially orthogonal to the mounting surface, the light oscillating in a first orientation;
a first set of image sensors arranged along the mounting surface, the first set of image sensors receiving reflected light oscillating in the first orientation;
a second set of image sensors arranged along the mounting surface, the second set of image sensors receiving reflected light oscillating in a second orientation substantially orthogonal to the first orientation,
a third set of image sensors arranged along the mounting surface, the third set of image sensors receiving reflected light oscillating in more than one orientation,
wherein the first set of image sensors and the second set of image sensors are surrounded by respective subsets of the light emitters.

28. The device of claim 27, wherein the light emitters are offset from the first and second sets of image sensors to prevent light originating at the light emitters from directly contacting the first and second sets of image sensors.

* * * * *